Figure 1:
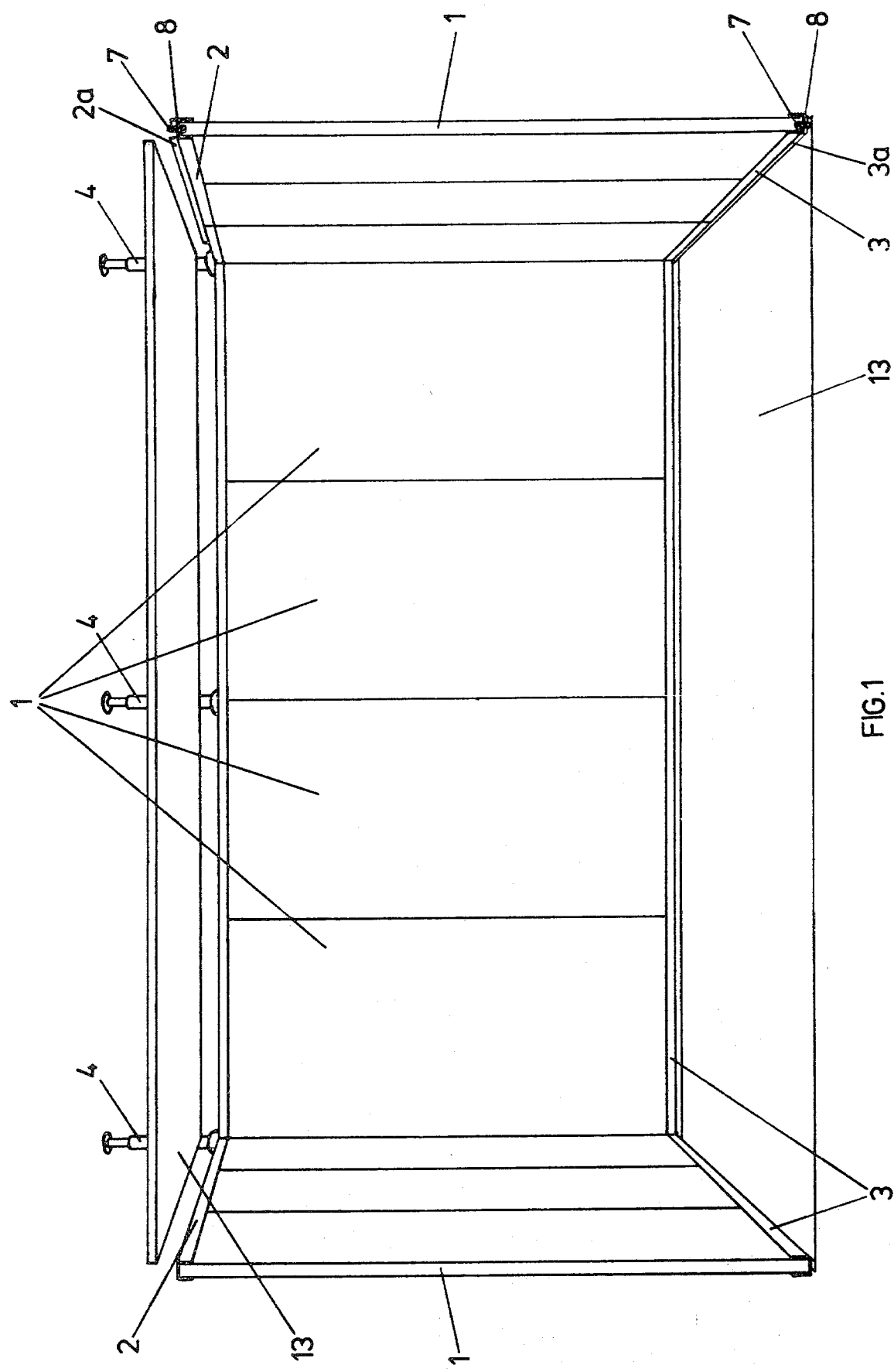

United States Patent [19]

Lueder

[11] 4,309,999
[45] Jan. 12, 1982

[54] EQUIPMENT FOR THE HOMOGENEOUS RADIANT CONDITIONING OF A ROOM ENCLOSURE FOR THERAPEUTIC PURPOSES

[76] Inventor: Holger Lueder, Loretostrasse 3, CH-6300 Zug, Switzerland

[21] Appl. No.: 130,709

[22] Filed: Mar. 17, 1980

[30] Foreign Application Priority Data

Mar. 28, 1979 [DE] Fed. Rep. of Germany ....... 2912196

[51] Int. Cl.³ .............................................. A61H 33/06
[52] U.S. Cl. ................................................... 128/371
[58] Field of Search ......................... 128/371, 373, 402

[56] References Cited

U.S. PATENT DOCUMENTS

| | | | | |
|---|---|---|---|---|
| 628,351 | 7/1899 | O'Neill | | 128/373 |
| 1,564,552 | 12/1925 | Gerdes | | 128/371 |
| 2,184,418 | 12/1939 | Faigle | | 128/373 |
| 2,579,964 | 12/1951 | Reynolds | | 128/373 |
| 3,271,786 | 9/1966 | Joy | | 128/371 |

Primary Examiner—William E. Kamm

[57] ABSTRACT

The equipment includes a tepidarium room with walls of insulation boards, the sides of which that face the room carrying an electrically conductive meander band that serves as a surface heating element covered with an insulating plastic foil and shielded by a metal foil. The equipment includes means to increase the transfer of heat from the heating element to the heat-radiating surface of the insulation boards, a coating which reflects radiant heat on the parts of the room enclosure that are not directly heated, ventilating openings in the walls close to the cold floor by which the room air temperature can be lowered draft-free at least 4° C. below the mean radiation temperature, a control device for the automatic adjustment of the mean radiation temperature, a fault current safety switch, and an alarm system activated upon failure of the energy supply or upon occurrence of an impermissibly high temperature.

34 Claims, 26 Drawing Figures

EQUIPMENT FOR THE HOMOGENEOUS RADIANT CONDITIONING OF A ROOM ENCLOSURE FOR THERAPEUTIC PURPOSES

The invention has as its subject homogeneous radiant air conditioning with a room air temperature that is considerably below the radiant temperature, which, according to the Viennese physicians H. Kramer and W. Ledwina, permits in a most economical manner, and while avoiding any climatic stress, the relaxation of the blood vessels and the support of the arteriolar peristalsis that facilitates the blood circulation. The invention includes the concept of providing gentle radiant heat to the body of a person within a room enclosure while maintaining a relatively low air temperature. Such an enclosure is referred to herein as a "tepidarium", a term used previously to describe an intermediate temperature room in an ancient Roman bath.

H. Krammer and W. Ledwina have discovered that the blood pressure of hypertonic persons is reduced to basal values within 20 minutes in such a room climate, so that negative after-images in the eye disappear approx. twice as quickly, and the recovery time for sensory receptivity is thus shorted by up to 50%.

H. Lueder observed in a female patient with strong rheumatic complaints restricting mobility, who had slept in a tepidarium with 36° C. radiant temperature and 25° C. room air temperature one night each week over a period of three months, a vegetative, complete change from the antiinfectious to the antiphlogistic phase, after which the rheumatic pain subsided completely and mobility was permanently restored to the extremities.

H. Lueder also observed that the healthy person requires a considerably shorter period of sleep at night, frequently as little as 4 hours, in the radiant climate with a completely surrounding radiant temperature of 37° C. and a room air temperature of 25° to 28° C. Repeated sleeping in such a radiant climate led, in cases of pathology, to uniform blood circulation through the body's shell, to the breaking down of adiposus and cellulitis, to the rejuvenation of the skin on the entire body, especially also of the head, with already grey hair having been replaced by hair of the original color, and in one case of epilepsy to the disappearance of the dreaded fits.

In order to make such a drug-less climate therapy available to the general public and to enable the general practitioners to perform their examinations on relaxed patients, i.e. without the shock due to cold that the patient suffers upon disrobing in the normally air-conditioned room, the marketing of a portable tepidarium that could be set up without special requirements and permanent installation in ordinary rooms would be desirable. Such equipment is not available at present.

Known are only double-walled calorimeters in the form and size of a coffin, with hollow walls through which preheated air is circulated, while a horizontal current of cool air flows through its interior. Apart from the fact that it is impossible with these calorimeters to reduce the room air temperature significantly and draft-free below the radiant temperature of their walls, another disadvantage is the fact that the heat radiating field in their interior can be established and controlled only relatively slowly.

In an improved type of equipment, which has the disadvantage of not being portable, however, the heat radiating field is quickly established in the desired manner with electrically heated insulation boards that are glued to the walls facing the building, but blowers still had to be installed to lower the room air temperature, which press the cool intake air into a steam aimed tangentially to the ceiling or through a floor that allows air to pass through.

In contrast to this, the invention includes a new, portable Roman tepidarium to produce a homogeneous radiation climate with a uniform radiation temperature of, e.g., 37° C. and a uniform room air temperature of, e.g., in the range from 25° to 30° C.

With respect to climate technology, the invention aims at direct heating of the exposed surfaces inside living and work rooms in such a manner that their temperature no longer depends on the heat transfer to the outside world, as is the case with the known types of heating. Even with relatively little insulation in the outside walls, the ceilings under the roof and the floors on the first floor, a temperature gradient that is necessary for the complete separation of the interior climate from the exterior climate can be established in the parts of the room enclosure facing the outside; although the needed heating energy can be reduced quite considerably with good insulation attached to the outside of the walls.

Electrical surface heaters that can be mounted on walls and ceilings or built into the floor and permit a uniform heating of the room enclosure have been developed already. Particularly easy to mount are electrically heated insulation boards of rigid plastic foam, which are laminated on at least one side with kraft paper covered with aluminum foil or fiberglass matting, with the aluminum foil being provided with equidistant, narrow, straight-line recesses that make the aluminum foil into a meander band, for the purpose of adapting the electrical resistance to the line voltage. Until now, the connecting of this heating meander with lead-in trails required the separation of the kraft paper or fiberglass matting, at the ends of the meander band, from the plastic foam board, its careful attaching with wire staples to the lead-in metal strip and subsequent regluing to the plastic foam board. This somewhat involved construction process has now been considerably simplified with the assembly according to the invention.

Furthermore, the fact that unstable heating of the meander band may develop with the application of strong initial heating currents that result in short warmup times, since the meander band is strongly heated at one spot due to the positive temperature coefficient of the aluminum resistance. Safety measures for the prevention of possible fires are another characteristic of the present invention. Additional steps according to the invention are concerned with the homogeneous heating of the electrically heated insulation boards as well as with the establishing and keeping constant of a homogeneous heat radiation field within the space enclosed by the insulation boards and the draft-free lowering of the room air temperature below the temperature of the heat radiation field. For the latter purpose either a cooler stream of air was so far blown tangentially toward the ceiling or a supply of cool air was pressed through a hollow floor covered with porous wall-to-wall carpeting. In contrast to this, the invention utilizes a considerably simpler procedure and a special impedance of the heat transfer from the electrically heated walls to the air in the room.

Since the regular single- and double-track windows act as a large-surface radiation sink and upset the heat radiation field of the room in the winter, the invention requires that the room must be equipped with multi-pane or multi-foil laminated windows, if homogeneous radiant air-conditioning is to be achieved.

According to an additional idea of the invention, the person may be placed within a homogeneous radiation climate in the smallest space, on a lounge that receives radiation from above as well as from below by electrically heated insulation boards and is ventilated by the weak draft created by the chimney formed by the insulation boards.

Specifically, the equipment according to the invention for the homogeneous radiant air-conditioning of a room and particularly of a tepidarium and/or a lounge is characterized (a) by means that increase the transfer of heat from the heating element to the heat-radiating surface of the insulation boards in such a manner that the temperature of this radiating surface is largely the same as the temperature of the heating element and is kept homogeneous;

(b) by connecting—at the edge at each end of each meander band by means of welded joints—stronger lead-in foil strips, attached to the plastic foam board, with the metallic covering of the support foil of the metallic meander band that is firmly attached to the plastic foam board, said covering serving as heating element;

(c) by a coating—which reflects radiant heat and is protected against corrosion—on the parts of the space enclosure that are not directly heated, particularly also on the cold floor that is covered, in addition, in the areas of traffic, with skid-resistant netting, impregnated with a synthetic material and having a mesh size of approx. 1 centimeter;

(d) if desired, by a multi-pane or multi-foil laminated window in one of the walls of the room, tepidarium or the radiant air-conditioned lounge, which—if necessary by additional electrical heating—reflects the heat radiation accumulating inside the room at an only slightly lower radiant temperature;

(e) if desired, by a lounge in the tepidarium or a lounge with mini-tepidarium located over it, which consists of a bed frame positioned horizontally on legs, or suspended from the ciling and covered with relatively coarsely knotted net, and admits the heat radiation of the tepidarium, or from the electrically heated insulation boards attached to the bed frame, as well as the cooler room air to the human body lying on it as well as to most of the surfaces on which the body is lying;

(f) by a ventilation of the space with cool air entering through openings in the walls close to the cold floor, the size of which can be regulated, or through a ventilating slit between wall or electrically heated insulation board and floor, the height of which can be adjusted, by which means the room air temperature can be lowered draft-free at least 4° C. below the mean radiation temperature of all radiant and reflecting areas of the space enclosure;

(g) possibly by an impedance of the heat transfer from the electrically heated walls to the room air by means of reinforcing the boundary layer with an air cushion that is held stationary by mechanical means at the surface of the vertically positioned electrically heated insulation boards, but permits the heat radiation from the insulation boards to enter the room unhampered;

(h) by a control device for the automatic adjustment of the mean radiation temperature of all heated surfaces of the insulation boards facing the room or the human body to a uniform and chronologically constant temperature that can be freely selected in the range from 22° C. to 45° C.;

(i) by a fire protection achievable with a fault current safety switch, based on the fact that the heating element is already disconnected from the heating element via softened or burnt out insulation to the power supply net at a fault current of 30 mA, which flows off from the ground shield, during overheating or spark-over at any point of the meander band through which the heating current flows, before the overheated spot or the spark-over can ignite the plastic foam of the insulation board;

(k) by an alarm system that is activated upon failure of the energy supply from the power line or upon activation of a fault current safety switch connected in series with the surface heating elements, or upon generation of an impermissibly high temperature, i.e., upon failure of the electronic control of the radiation temperature.

As means according to (a) that increase the transfer of heat from the heating elements to the heat-radiating surface of the insulation boards, (aa) a design of the metallic meander band utilized for heating, in which the mutual distance of the straight-line portions of the meander band is very much smaller than the width of the meander band, but still sufficiently large to prevent spark-over from one to the neighboring meander band portion;

(ab) the choice of a heat-conducting material for the heat-radiating layer applied directly to the meander band, for which the electrical conductance of heat transfer per unit of surface by far exceeds the coefficient of heat transfer, i.e, the density of the heat current flowing from the surface of the insulation board facing the room at a difference in temperature of 1° C.

An overheating of the contact through which the heating current flows is prevented with connection of heavier foil strips, welded, according to (b), to the ends of the metallic meander band utilized as heating element.

When the ceiling facing the building according to (c) is screened against the room by heat radiation reflecting foil suspended at a distance below it, the room air temperature can be lowered permanently with (f) and (g) by more than 10° C. below the temperature of the heat radiation field. Thus in a tepidarium with a radiation temperature of 37° C. the bare body surface with the body nucleus is placed in a thermal equilibrium and the heat produced in the body by the burning of food is then transferred only to the homogeneously tempered, cooler room air, which prevents stress due to transpiration.

In conjunction with the means (a) and (c), the control device according to (h) permits for the first time the setting and maintaining of a radiation temperature in the room, independently of the room air temperature, the occupation of the room and the heat losses due to transmission to the outside.

Figure 2:
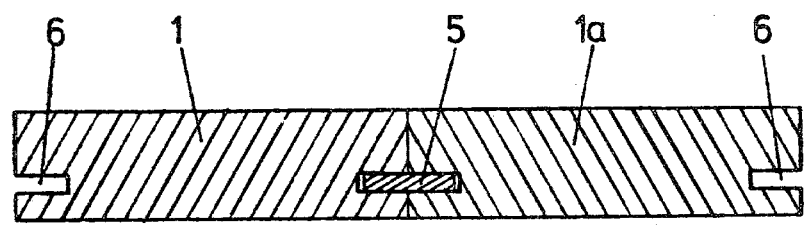
Figure 3:
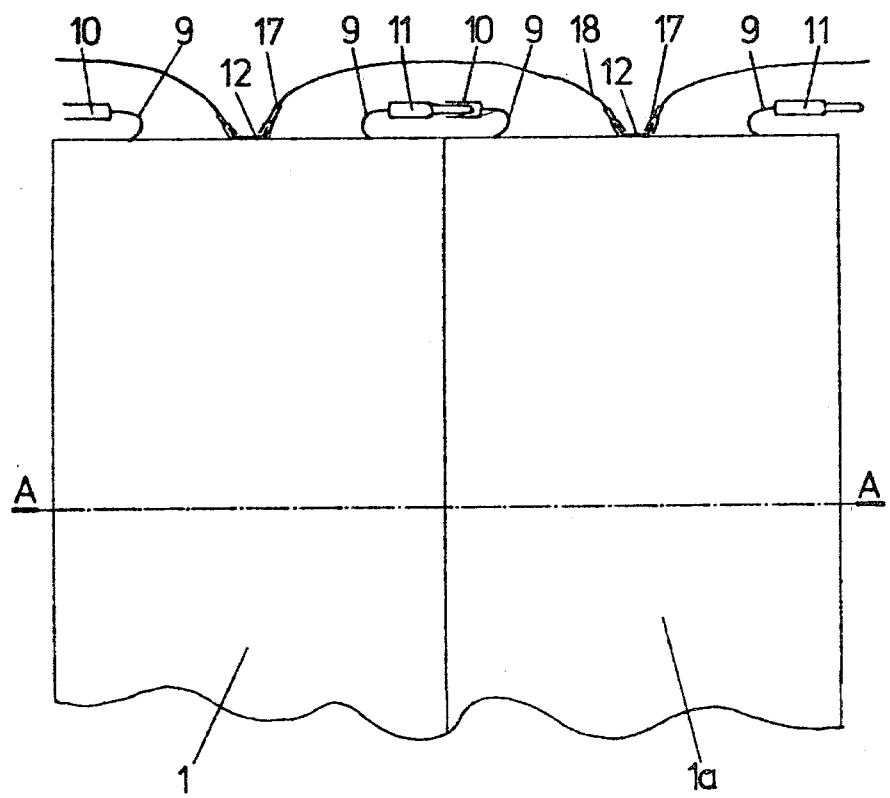
Figure 4:
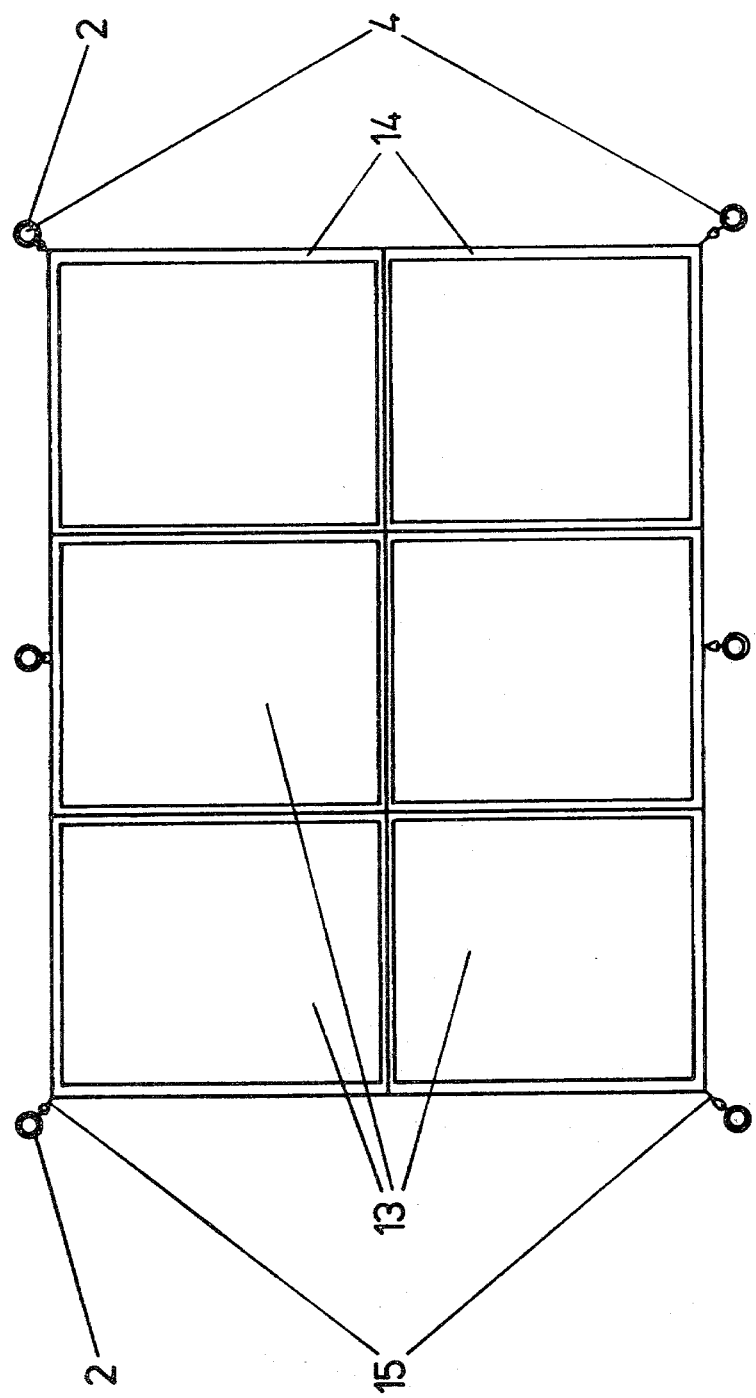
Figure 5:
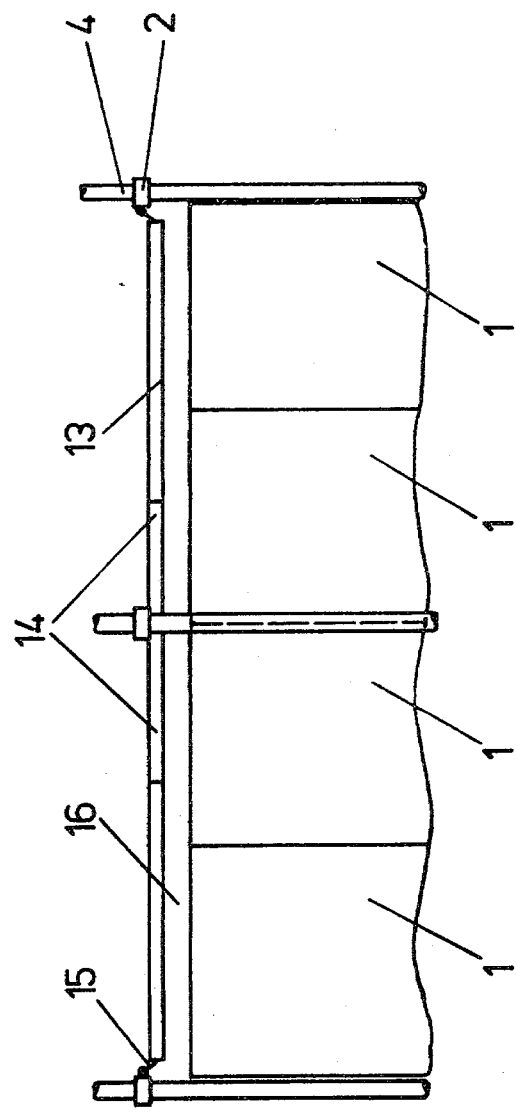
Figure 6:
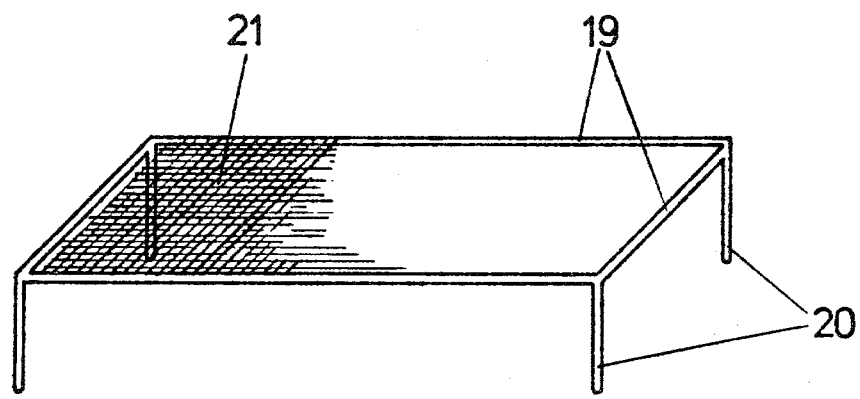
Figure 7:
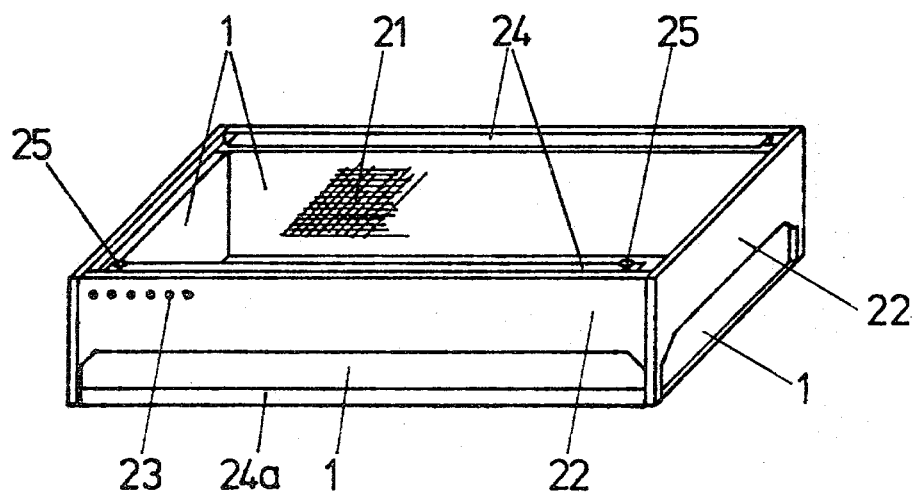
Figure 8:
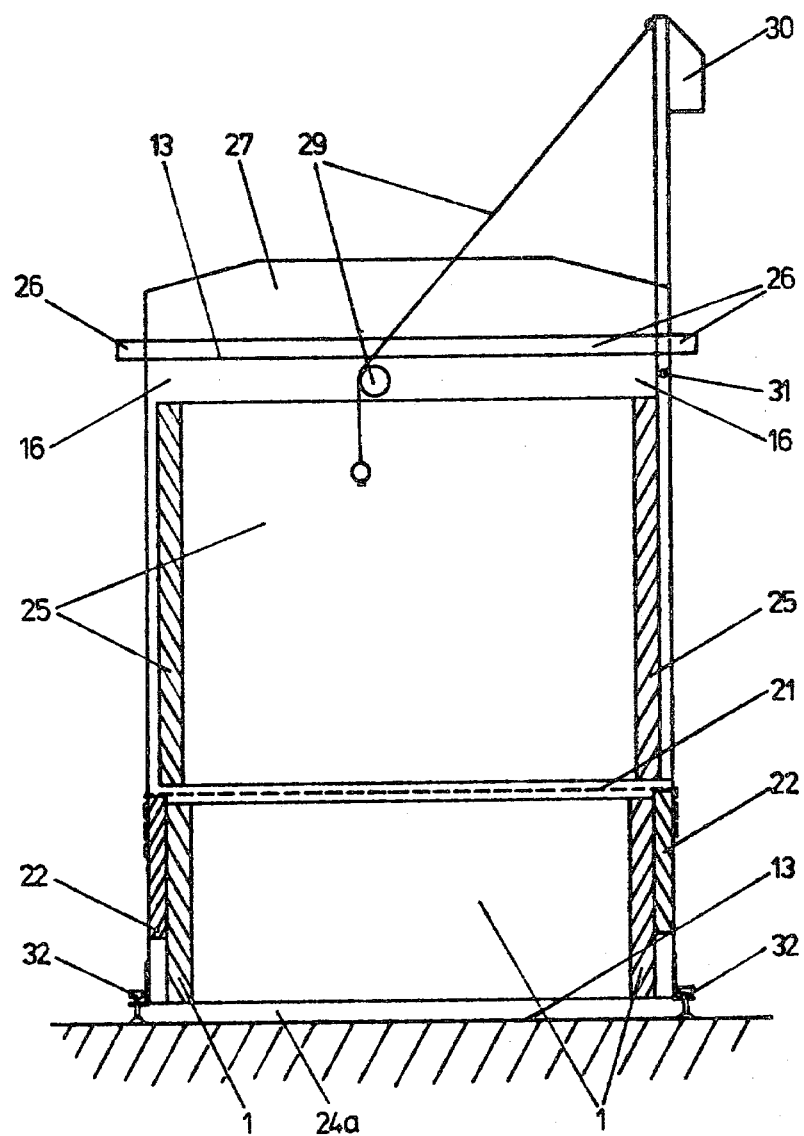
Figure 9:
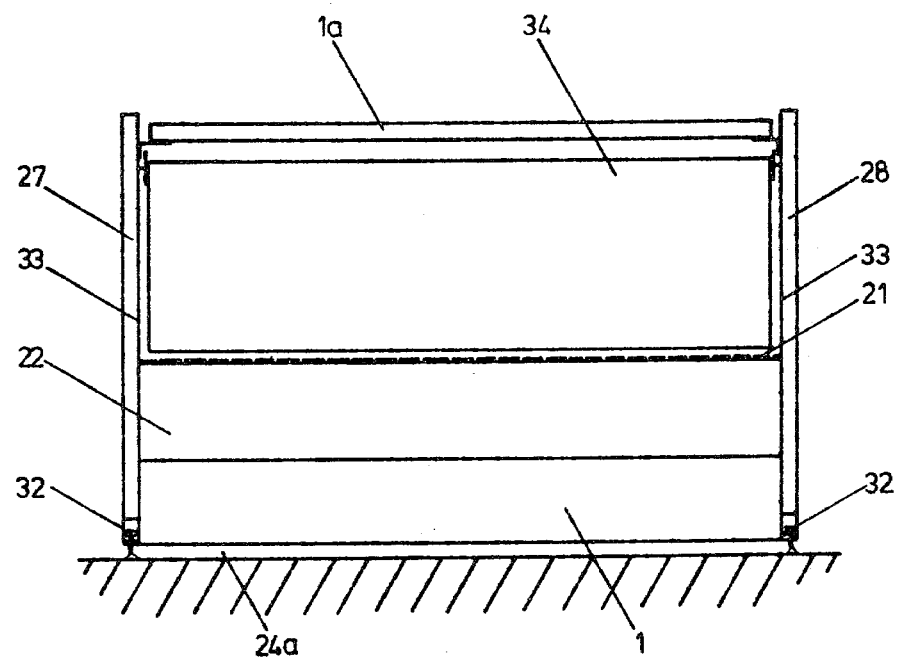
Figure 10:
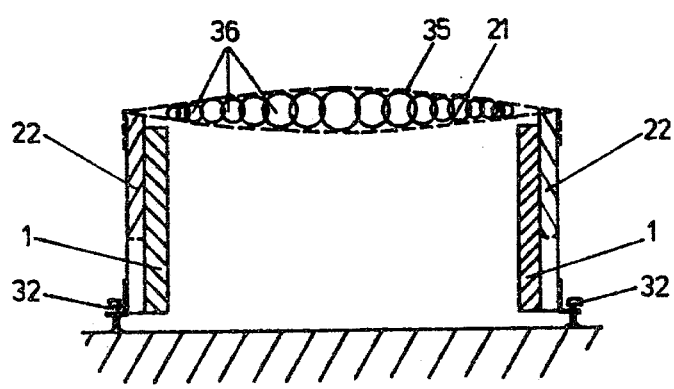
Figure 11:
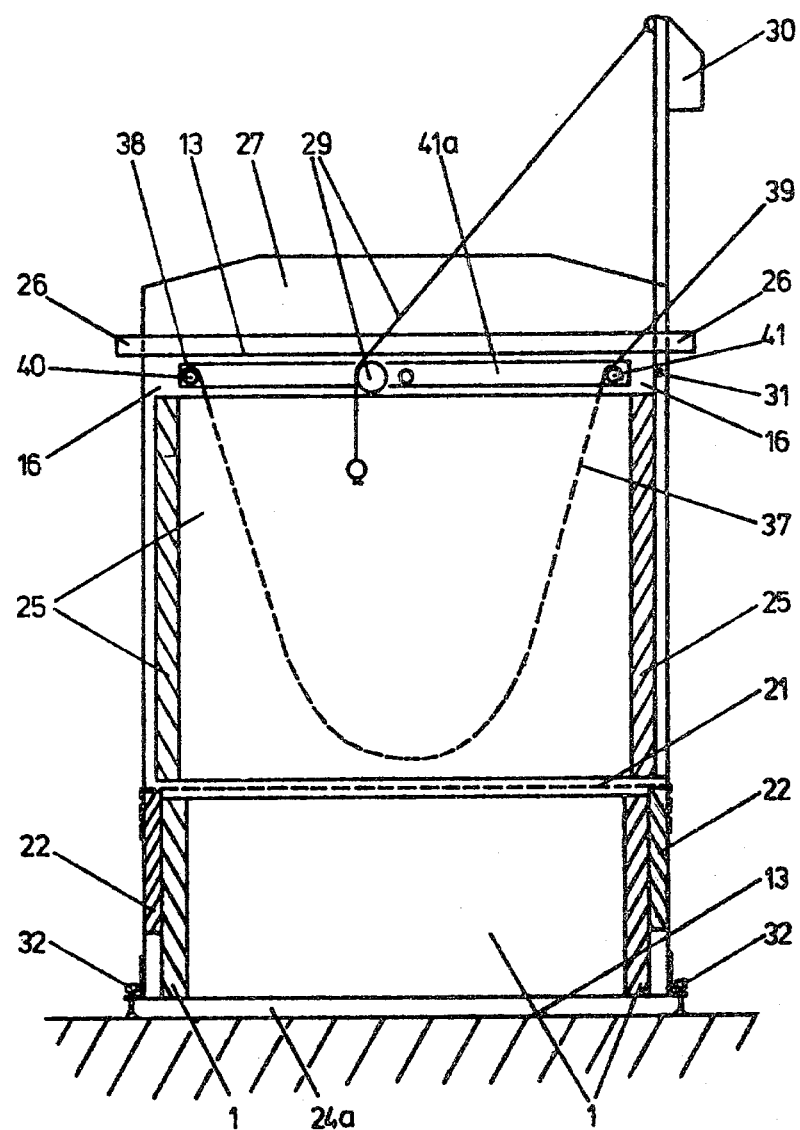
Figure 12:
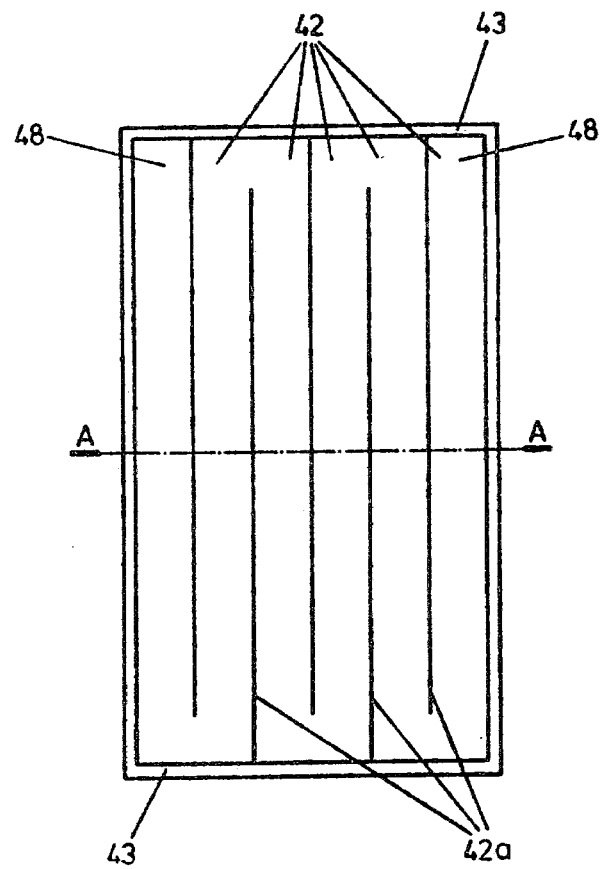
Figure 13:
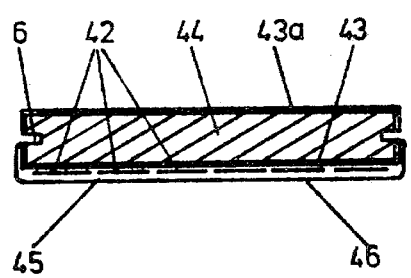
Figure 14:
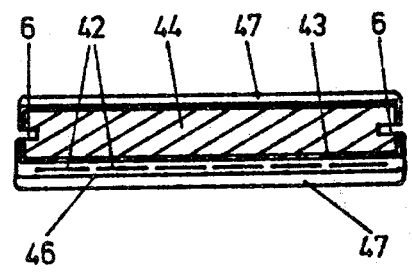
Figure 15:
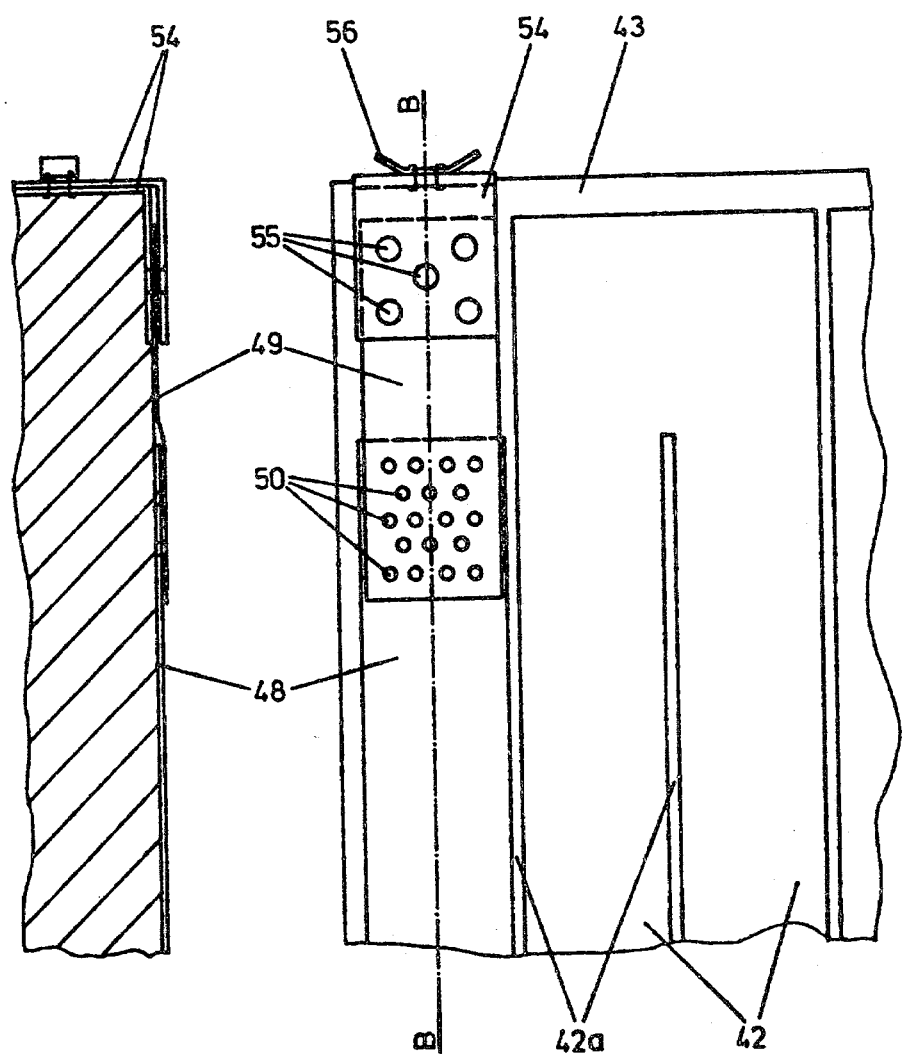
Figure 16:
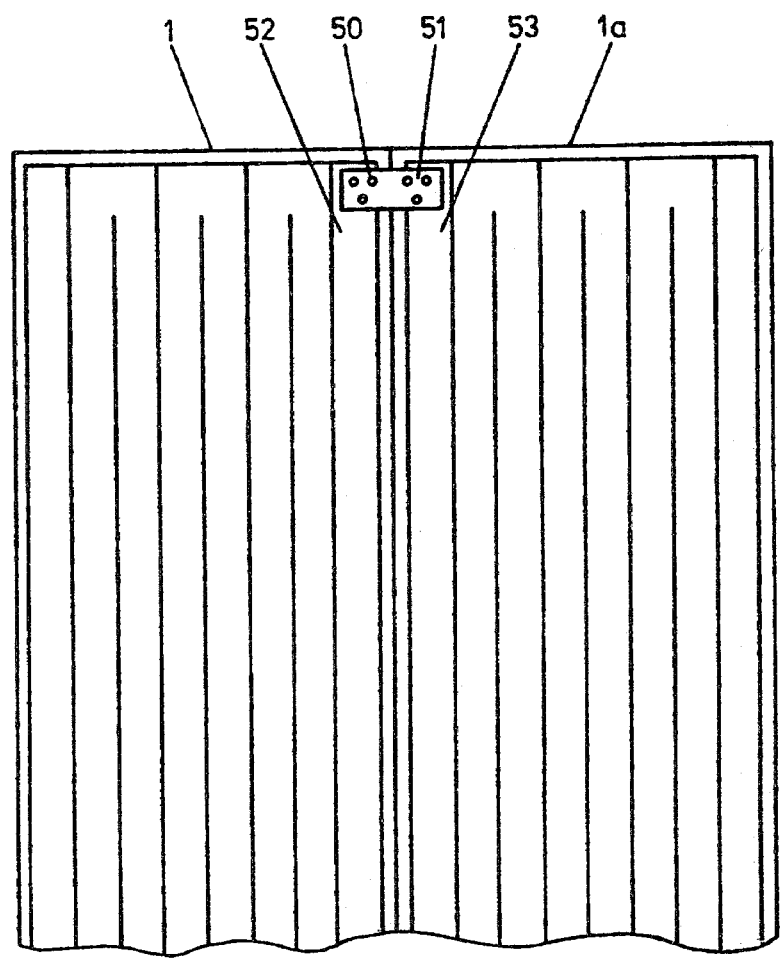
Figure 17:
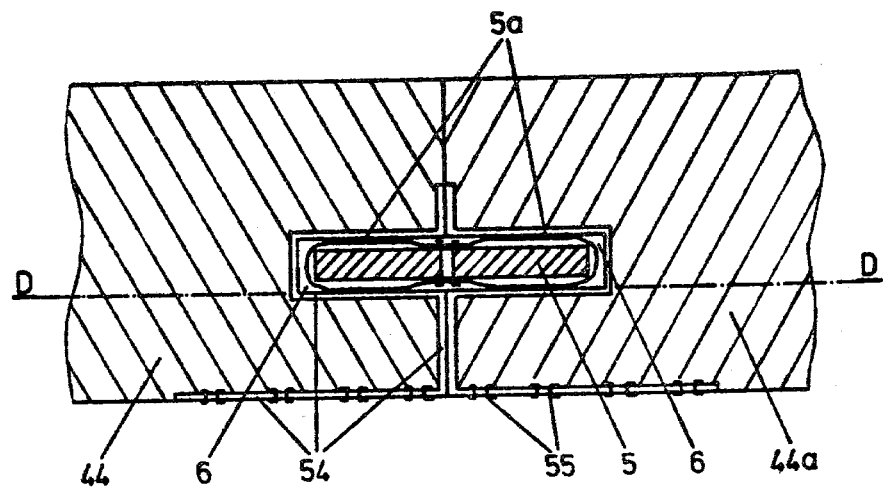
Figure 18:
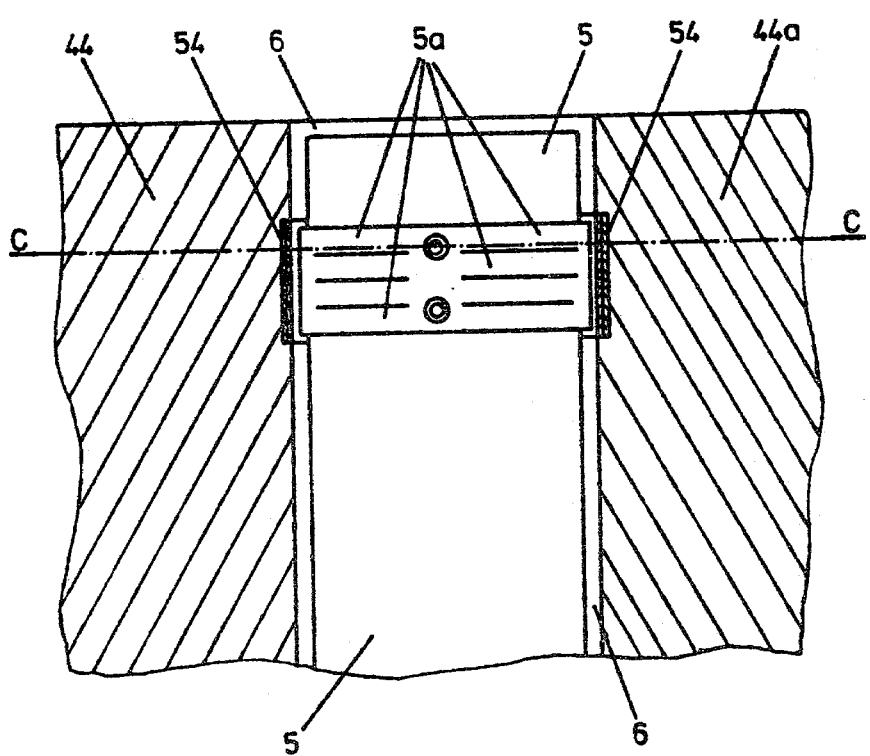
Figure 19:
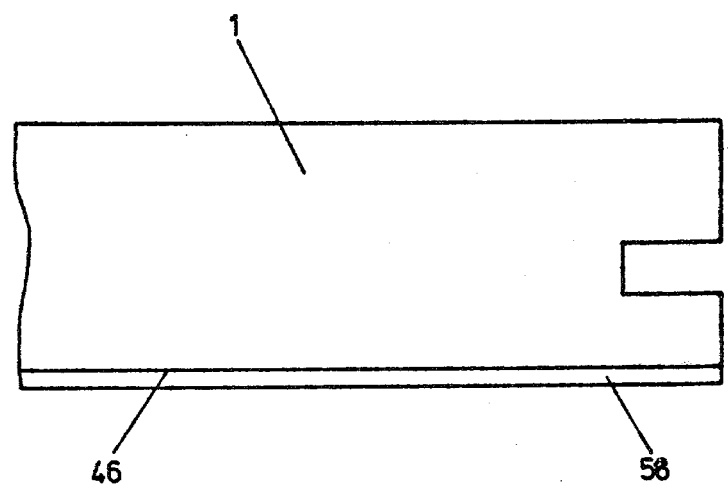
Figure 20:
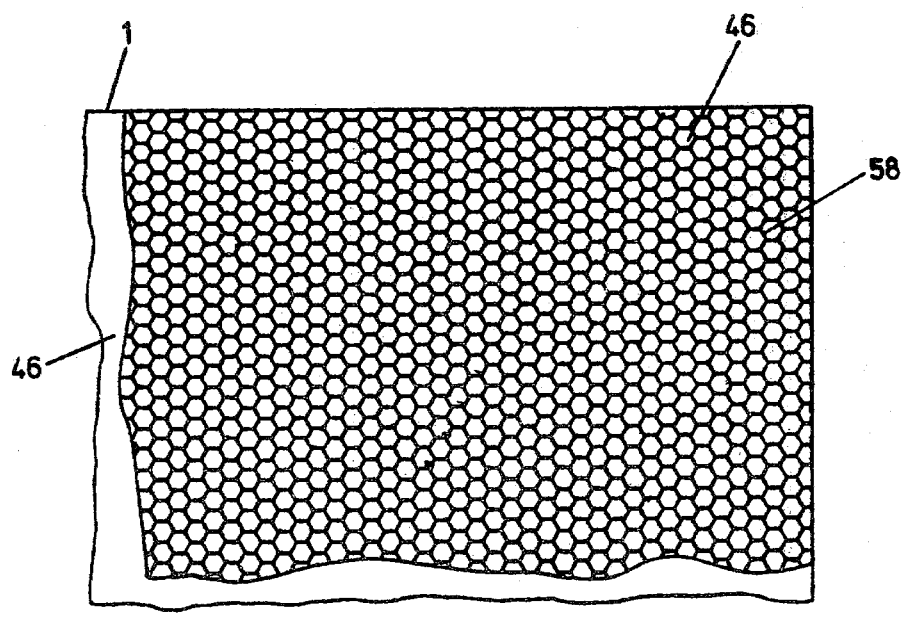
Figure 21:
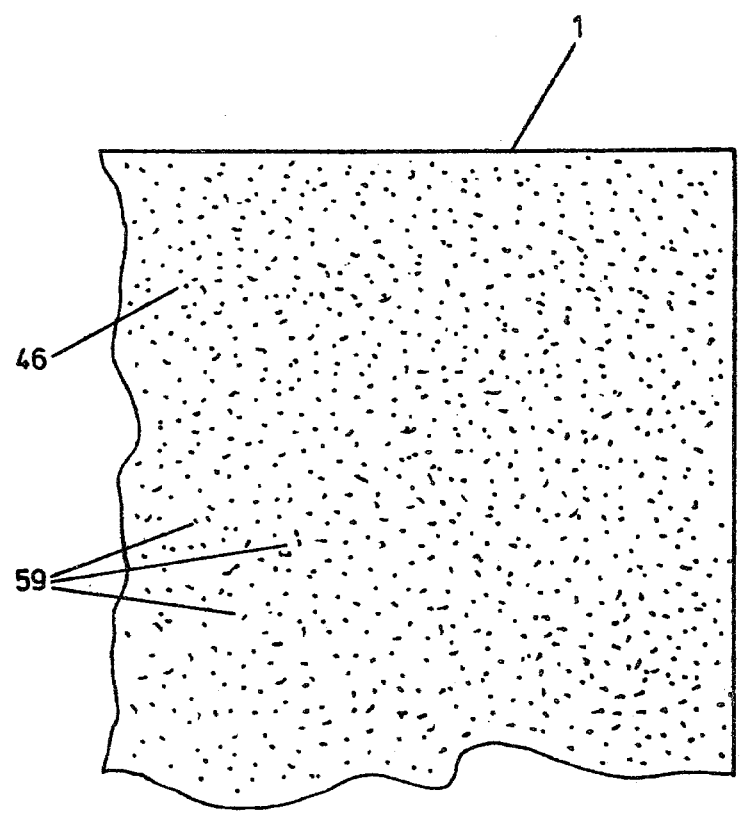
Figure 22:
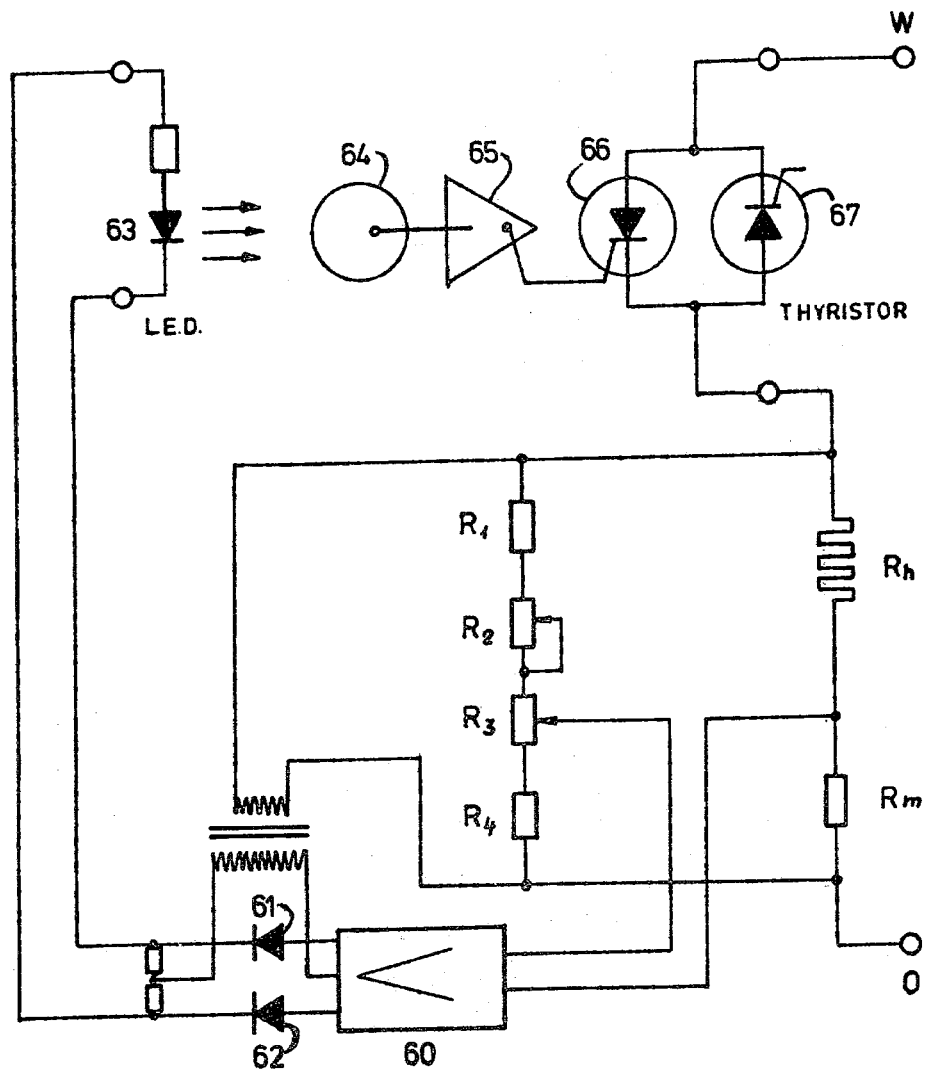
Figure 23:
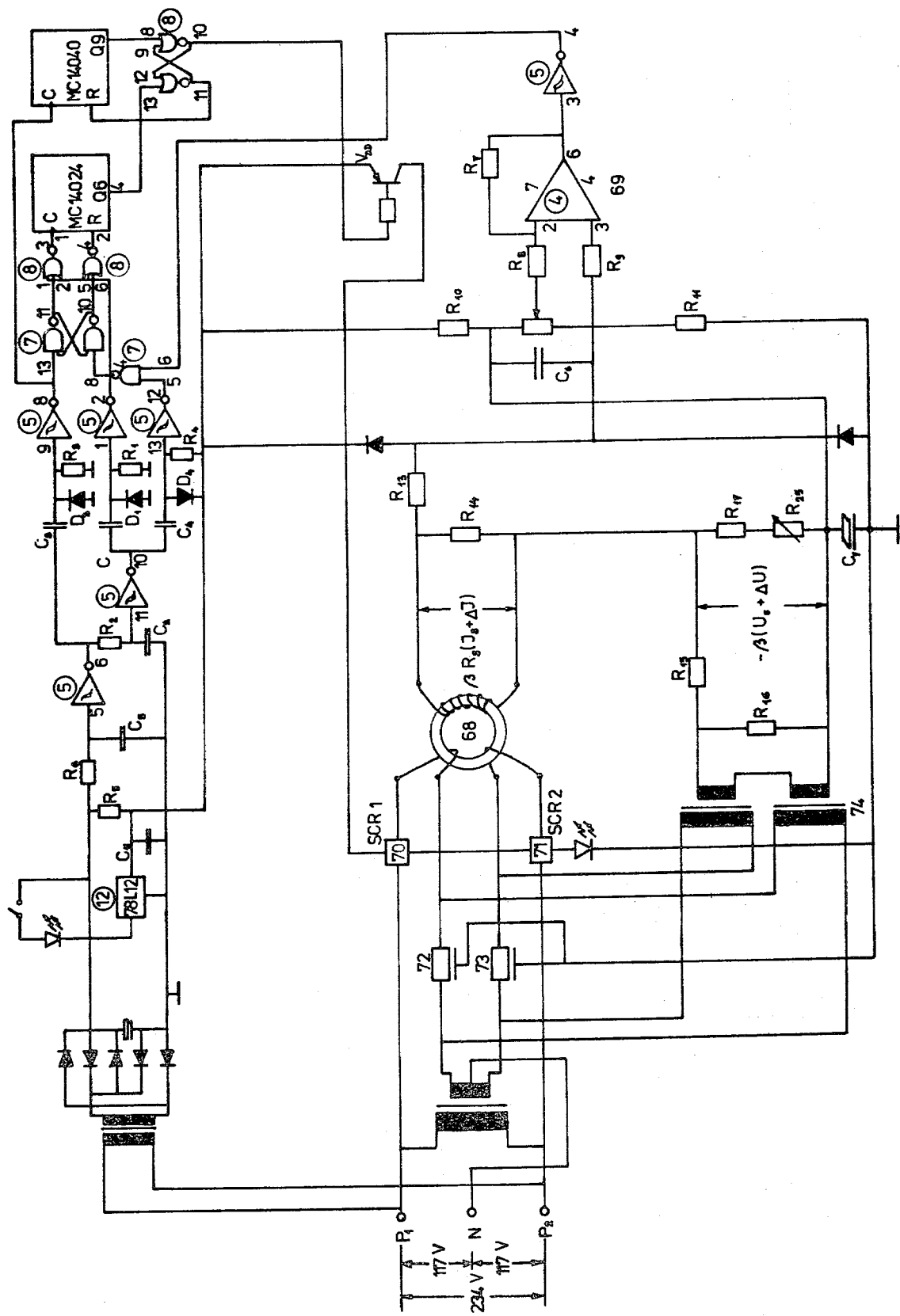
Figure 24:
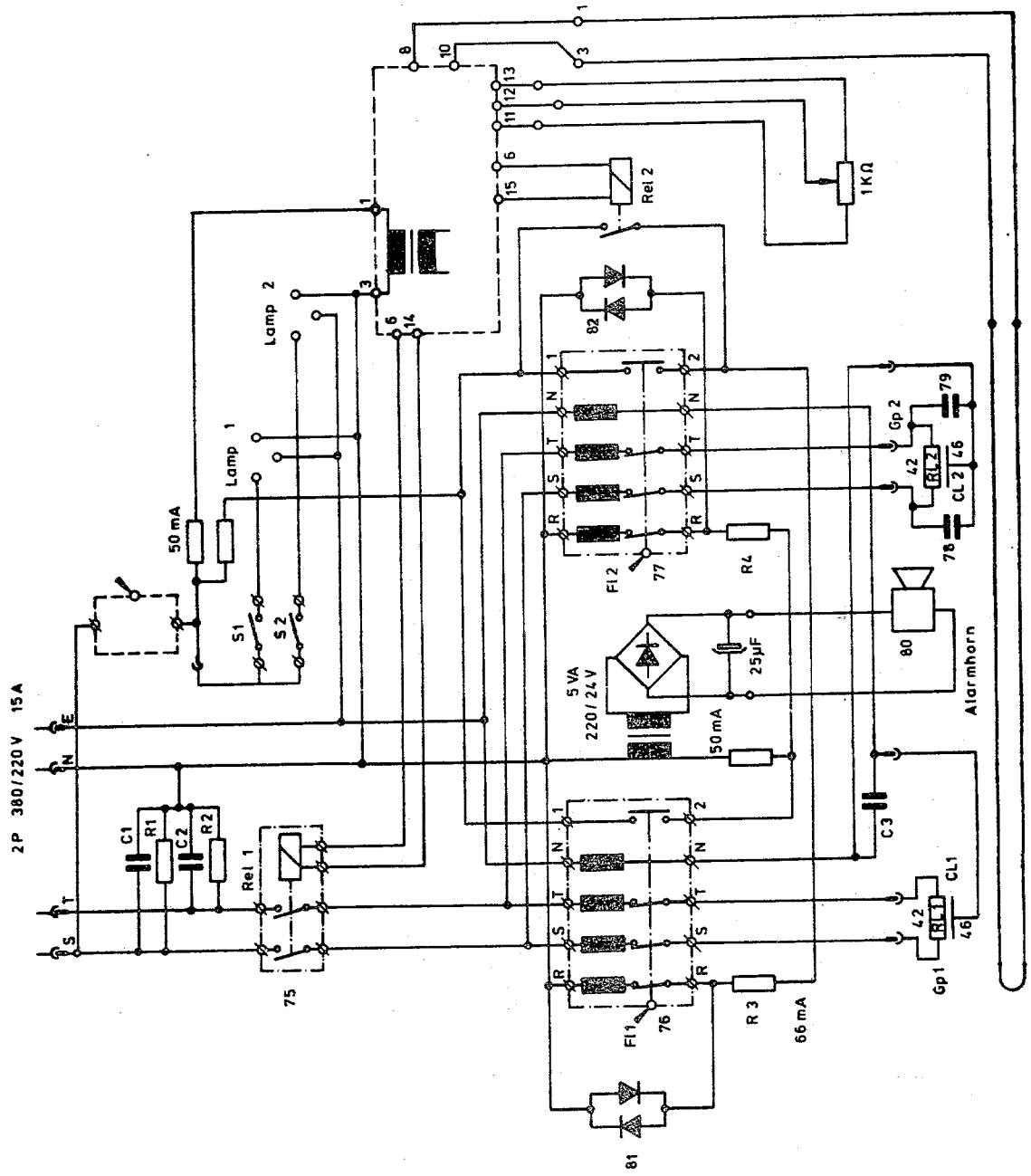
Figure 25:
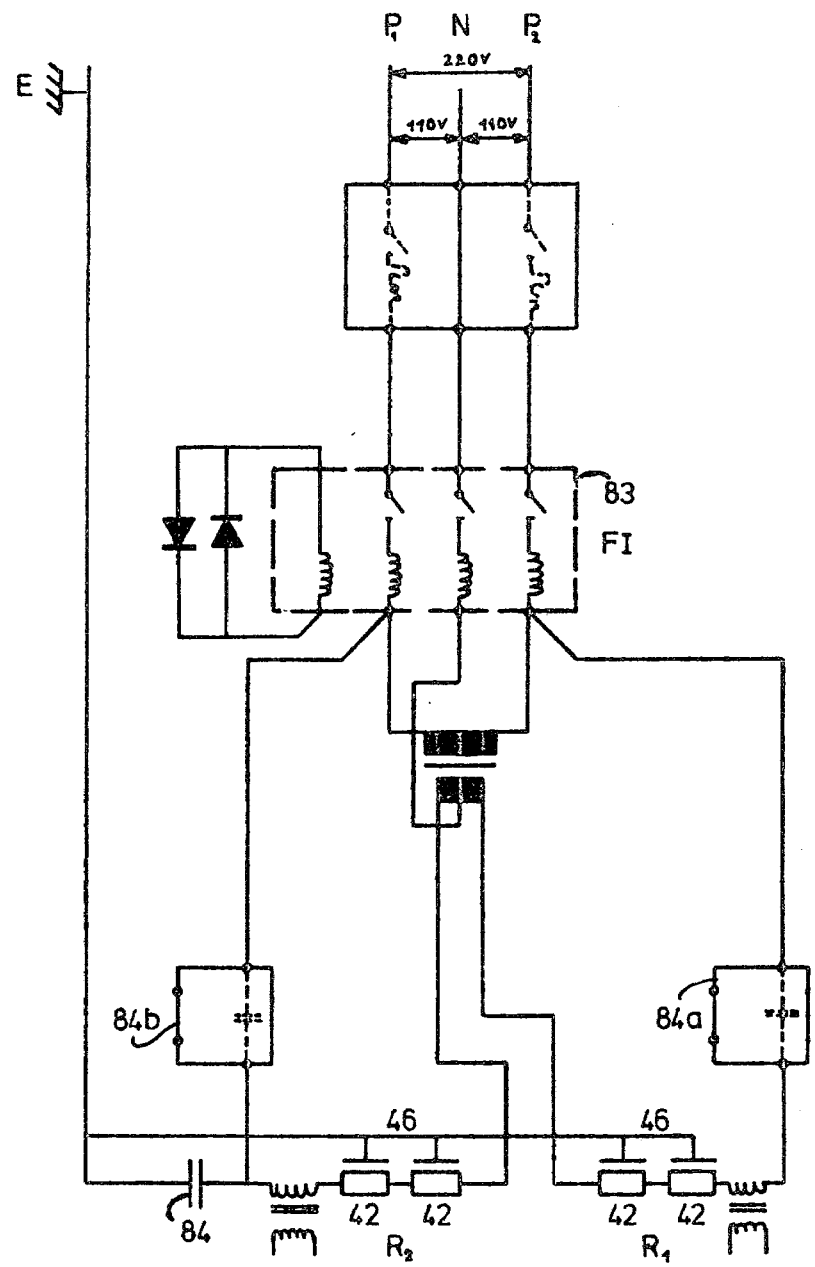
Figure 26:
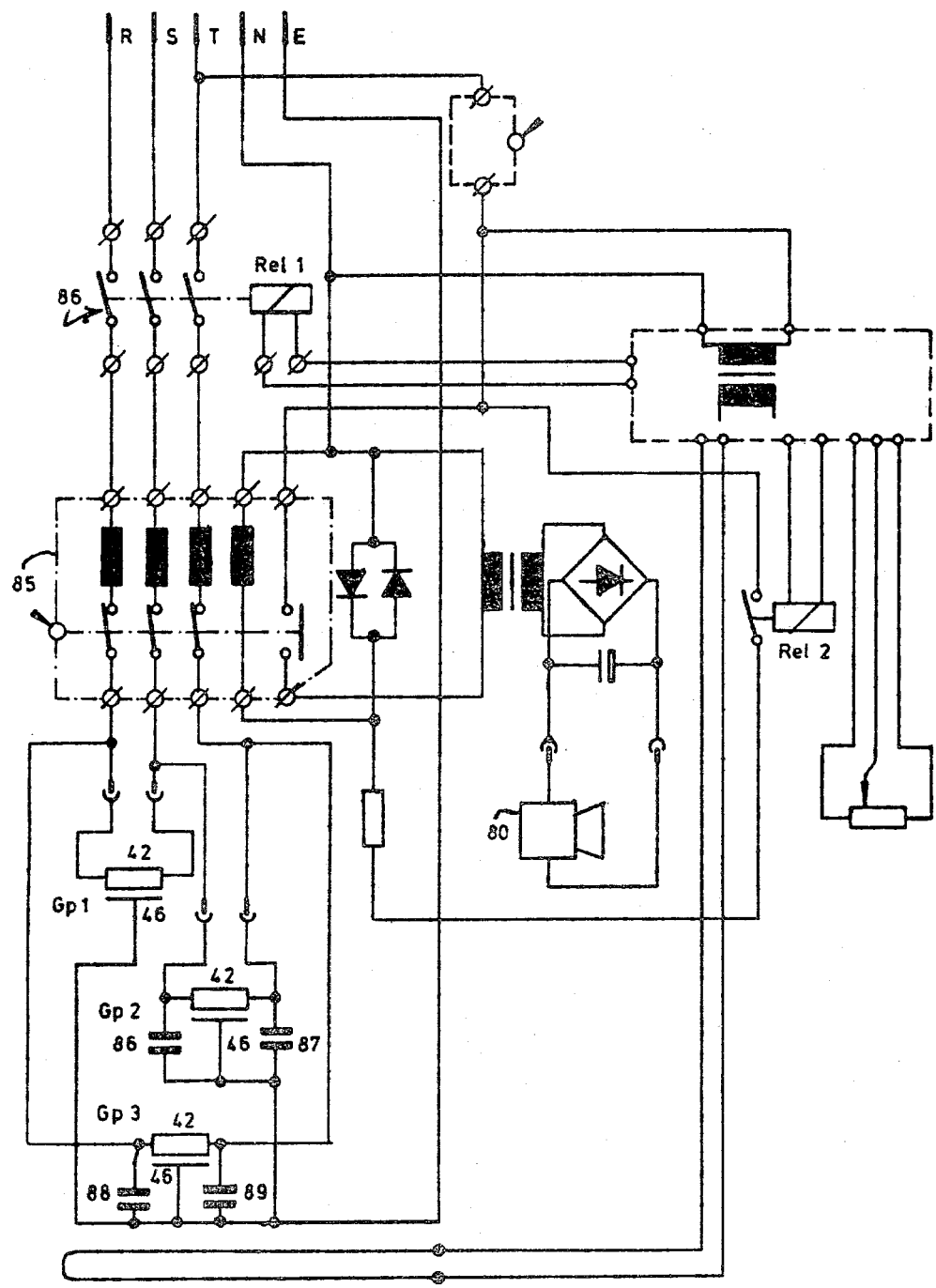

Examples of the subject of the invention are explained below with drawings. Shown are, FIG. 1 after removal of the front longitudinal wall, the construction of a tepidarium with floor and ceiling covering 13 reflecting heat radiation, electrically heated insulation boards 1 of wall height, bordered by U-tracks 2 and 3 and held by supports 4;

FIG. 2 two electrically heated insulation boards 1 and 1a joined together with tongue and groove, horizontal section;

FIG. 3 a special form of the electricl connections 9 with plug 11, socket 10 and plug-in catch 12 to the electrically heated insulation boards 1 and 1a;

FIG. 4 a form of the tepidarium ceiling, view from above, with frame 14 stretched and foil 13 reflecting heat radiation;

FIG. 5 the same ceiling, side view, above the upper edge of the electrically heated insulation boards 1;

FIG. 6 a bed frame 19 without mattress, to be placed in the tepidarium, to which a net 21, knotted of rope, is attached;

FIG. 7 a higher bed frame 22, to be placed in the tepidarium, with rope net 21, which has a frame of electrically heated insulation boards 1 on the inside, under the rope net, with at least one of the long sides being adjustable in height by means of thumb screws 25;

FIG. 8 cross section of an insulated radiant air-conditioned lounge with head board 27 and one frame each of electrically heated insulation boards 1 and 25 below and above the rope net 21, with a heat radiation reflecting foil 13 on the floor and on the frame 26 above the insulation boards 25;

FIG. 9 the longitudinal section of a radiant air-conditioned, insulated lounge with a frame of electrically heated insulation boards 1 below the rope net 21, an electrically heated insulation board 1a, arranged horizontally at head height above the rope net 21, and a bed frame reflecting heat radiation consisting of a heat radiation reflecting foil cover 33 at head board 27 and foot end 28 and suspended blinds 34 above the rope net 21;

FIG. 10 the cross section of a convex mattress consisting of the rope nets 21 and 35 and horizontal coil springs 36 separating the former, which allows the room air as well as the heat radiation of the electrically heated insulation boards 1 attached to the bed frame 22 to flow through;

FIG. 11 the cross section of a radiant air-conditiond lounge with a second, wide-mesh rope net 37 to support the chest, abdomen and thighs in a prone position, which, suspended from the horizontal pipes 40 and 41 of a frame that can be turned around its rigid longitudinal axis, permits the turning of the body into any lateral position;

FIG. 12 a metallic meander band 42 on an electrically nonconducting support foil, for example a kraft paper band 43, which was laminated solidly to a rigid plastic foam board 44 in a so-called double-band system by expanding polyurethane or polyisozyanurate, which meander band was produced by the electrical burning of narrow, straight grooves 42a into the laminated metal foil by means of graphite leads mounted on metal and acting as electrode;

FIG. 13 the section A—A through the rigid foam board 44 with the metallic conducting meander band 42 on the support foil 43 and the electrically insulating cover 45 enclosing the rigid foam board at the edges, which cover can be covered, in turn, on the outside, with a metal foil 46 that must be connected to the ground;

FIG. 14 the cross section through an electrically heated insulation board according to FIG. 13, with an additional smooth plaster coating 47 on its heated and on its unheated side;

FIG. 15 spherical welded contacts 50 of a flexible aluminum sheet metal strip 49 at the end 48 of the thin meander band 42 of aluminum applied to the tear-resistant kraft paper 43; and the contact made by means of a folded copper and aluminum sheet metal piece 54, which firmly encloses the other end of the aluminum sheet metal strip 49 by means of the inserted copper rivets;

FIG. 16 the electrical connection of two adjoining aluminum meander bands 42, firmly mounted by means of a flexible aluminum sheet metal strip 51, which is attached to the ends of meander bands 52 and 53 to be connected, by means of spherical welding seams 50;

FIG. 17 the horizontal section C—C through two electrically heated insulation boards 1 and 1a, with the copal (copper-aluminum) sheet metal edging 54 of the aluminum sheet metal strip 49 being inserted in the latter's groove 6;

FIG. 18 the vertical section D—D through two electrically heated insulation boards 1 and 1a with view on the tongue 5 and the slotted contact spring strip 5a attached on it;

FIG. 19 the view onto a vertical, electrically heated insulation board 1 with a honeycomb net 58, made of thin, polished aluminum foil, glued to its radiating side 46 for the reduction of the transfer of heat to the room air;

FIG. 20 the side view of the electrically heated insulation board 1 represented in FIG. 19, with the honeycomb net 58 glued to its radiating side 46;

FIG. 21 synthetic fiber pieces 59, vertically applied by dusting and gluing to the radiating side 46 of an electrically heated insulation board 1, to reduce the transfer of heat to the room air;

FIG. 22 schematic wiring for the thermostatic regulation of the heating current via the temperature-dependent heating element resistance $R_h$ in a Wheatstone bridge with the in comparison to $R_h$ small temperature-independent series resistance $R_m$, in which the alternating voltage occurring in the zero branch, rectified in phase, is used to control two thyristors 66 and 67 lying in the heating circuit and connected antiparallel;

FIG. 23 a schematic circuit for the thermostatic regulation of the heating current through the two heating element groups 72 and 75 with their temperature-dependent resistance R, whose deviation $\Delta R$ at the high-voltage side of an operational amplifier 69 from the reference input $R_s$ with the difference of heating element voltage and heating element current J, carried through the solid state relais 70 and 71;

FIG. 24 a schematic circuit for the fire and contact protection of two groups Gp 1 and Gp 2 of surface heating elements 42 equipped with ground shield 46, which are connected through two 30 mA fault current safety switches 76 and 77 and the mercury relais 75 to the two phases S and T of the three-phase power supply, with the capacitive fault current of the one group carried through a third winding N of the fault current safety switch of the other group and adapted to the fault current of the other group through the condensers 78 and 79;

FIG. 25 a schematic circuit for the fire and contact protection of two groups Gp 1 and Gp 2 of surface heating elements 42 equipped with ground shield 46, which are connected through a 30 mA fault current safety switch 83 and two solid state relais 84a and 84b with the two 110 V phases of an American power supply, with the greater capacitive fault current of group Gp 1 being compensated for by the capacitive fault current of group Gp 2 and condenser 84;

FIG. 26 a schematic circuit for the fire and contact protection of three groups of surface heating elements 42 equipped with ground shield 46, which are connected to the 3 phases of the three-phase power supply through one 30 mA fault current safety switch 85 and a 3-pole mercury relais 86, with the highest capacitive fault current of group Gp 1 being compensated by the capacitive fault currents of the second and third groups with the additional condensers 86, 87, 88 and 89.

As is apparent from the perspective of FIG. 1, the walls of the tepidarium are composed of individual, easily transportable electrically heated insulation boards 1 with a height equal to that of the wall and held perpendicular between U-tracks 2 and 3 at their upper and lower edges. The latter are secured at least at the four corners of the room enclosed by them, either to posts or supports 4, which, as in the case of book cases, are wedged between the ceiling and floor of the building. The electrically heated insulation boards 1 are joined by tongue 5 and groove 6, according to FIG. 2, to obtain a smooth, heat-radiating surface. One part of the electrically heated insulation boards is fitted with pivots 7 in the rotational axis, to use as door. As shown in FIG. 1, these pivots engage in corresponding openings 8 of a second U-track 2a, connected with the U-track 2 and a flat track 3a connected with the U-track 3. The door can be locked from the inside with a cabinet lock, the locking bars of which engage on locking at the top and bottom in corresponding openings of the tracks 2a and 3a. The gaps between door and wall are filled with soft plastic foam to prevent drafts.

As shown in FIG. 3, each electrically heated insulation board 1 has at its upper edge, close to the two corners, one insulated, stranded copper wire 9, each connected with the ends of the metallic meander band, which is fitted with an insulated socket 10 on one side of the board and with an insulated plug 11 on the other side of the board. The boards can consequently be connected in series electrically in a simple manner by plugging the adjacent socket 10 and plug 11 together. A double-sided plug-in catch 12 is attached in the center between the stranded wires carrying current. These plug-in catches permit an uninterrupted connection of the ground shields with the ground through connecting cables 18 equipped with connecting sleeves 17. All connecting cables are covered by U-track 2.

The space enclosed by the electrically heated insulation boards 1 is closed off above with foil 13 that reflects heat radiation on both sides, serves as tepidarium ceiling and is stretched over assembled frames 14, as shown in FIG. 4, in front view, and FIG. 5, from above. The frames 14 may either be attached directly to the ceiling of the building or suspended with eyes 15 from supports 4. Thanks to an air or plastic foam insulation and/or reflection of the heat radiation coming from the building ceiling, the foil quickly reaches the temperature of the air passing it, as it rises from the bottom, so that this air cannot sink back into the room upon cooling; consequently it leaves the room as exhaust air through air vent 16, left between the upper edge of the tepidarium walls and the foil cover.

In order that the heat radiation as well as the room air, which is lowered in its temperature, can surround the human body resting on a lounge not only from the top but also its surface on which it is resting from the bottom, the bed frame in the tepidarium is constructed as tubular frame 19 with tubular legs 20 and covered with a relatively wide-mesh, tear-proof net 21 knotted of rope, as shown in the perspective drawing in FIG. 6. A net of nylon rope can be stretched so taut over the bed frame that it sags only little under the weight of the human body and allows at least lying on the side. The heat radiation of the tepidarium reaches the resting surfaces by way of reflection from the foil that is spread on the floor and reflects the heat radiation.

If objects in the enclosed space, e.g. a second bed with regular mattress, should screen out the heat radiation of the tepidarium too much from the floor under the bed frame 19 standing next to it, this bed frame 22, according to FIG. 7, as usual of wood, can be raised higher and covered with the tear-proof rope net 21 by hanging each mesh of the rope net over the head of an oval head screw 23 on the outside. To prevent the sides of the bed frame 22 from sagging as the human body presses on the rope net, these sides of the bed frame are reinforced on the inside with steel angles 24, screwed on directly below the rope net. In this case, the heat radiation underneath the rope net 21 emanates from electrically heated insulation boards 1 that are attached to the inner surfaces of the bed frame 22, extend down to the floor and radiate into the enclosed space of the lounge. The electrically heated insulation board can be moved vertically by means of thumb screws 25 at least at one long side, to permit the cool air, which is channeled into the tepidarium from the outside, to enter the enclosed space of the bed frame in controlled quantities through a shallow conduit located on the floor.

As shown in FIG. 8, a cross section vertically to the longitudinal axis, the heat radiation field above the rope net 21 can be produced more cheaply by a second frame 25 of electrically heated insulation boards and—at a distance above it—a heat radiation reflecting foil 13 stretched over a horizontal frame 26 instead of by the tepidarium. For access to the lounge, at least one long side of this frame can be opened with the aid of rope and pulley 29 and counterweight 30, by turning it around its axis 31. However, the frame 25—together with the foil frame 26 located above it—can also be drawn to the ceiling of the enclosed room by a rope and pulley with counterweight.

The air in the surroundings of this radiant air-conditioned lounge is allowed to enter the inner space of the lounge through an air vent at the floor controlled by thumb screws 32, and leaves this by thermal updraft as warmer exhaust air through the wider air vent 16 between the upper edge of the heating frame 25 and the heat radiation reflecting foil cover 13.

Another construction form of the radiant air-conditioned lounge differs according to the vertical section of FIG. 9 from the form shown in FIG. 8 only in that frame 25, formed of electrically heated insulation boards, is replaced by a heat radiation reflecting layer 33 at the head board 27 and the foot board 28 of the bed frame, by suspended blinds 34 of heat radiation reflecting foil at least on one side of the bed frame and the reflecting ceiling 13, by assembled insulation boards 1 that are electrically heated on their underside.

Another construction form of the radiant air-conditioned lounge differs from that shown in FIG. 8 by the replacement at least in part, of the electrically heated insulation boards of frame 25 with electrically heated, transparent foils that, when carrying a current, fill the room above the rope net 21 homogeneously with radiant heat of a constant temperature in the range from 30° to 42° C. Semi-conducting, transparent plastic foils or two laminated, normal, glass-clear plastic foils with thin heating wires in the form of a meander embedded in their adhesive layer, may serve this purpose. Fashioned into blinds, these foils can make room for entering and leaving the radiant air-conditioned lounge. Otherwise, the horizontal frame 26 covered with the heat radiation reflecting foil, together with the heating foils, can be pulled to the building ceiling by a rope pulley, from the inside of the lounge.

Since the rope net 21 generally sags too much when weighted down by the human body, lying on the stomach or side is found to be uncomfortable. This unpleasant situation is corrected according to the invention by stretching two knotted rope nets 21 and 35 over the bed frame, which are spaced, according to the cross section in FIG. 10, by coil springs 36 of thin stainless steel wire that are arranged longitudinally, and are firmly connected with the individual openings of nets 21 and 35 at their points of contact. The result is an upwardly convex mattress that is adequately permeable for air and heat radiation to allow the radiant climate to surround the human body lying or it from all sides.

Another possibility to lie comfortably on the side or stomach in the homogeneous radiant climate is given, according to FIG. 11, with a second or additional net(s) 37, which are attached, opening by opening, to tubular hoops 38 and 39 above the rope net 21 stretched over the bed frame, and are suspended with these hoops from two horizontal metal pipes 40 and 41 of a frame that turns about a rigid center axis 41a. The particular advantage of this type of suspension of parts of the body is seen in the fact that the trunk rolls unhindered on the supporting net 37 when turning from the prone position, that head and trunk are supported and the female breast is freely pendent in the prone position, and the supporting rope net 37 can conform to individual body contours when each net opening is attached. While net 37 must be knotted of firm rope for the suspension of the trunk, a considerably finer net of thin thread and with a mesh size of a few millimeters is generally adequate to support the head in the lateral position. In the prone position, the head may also be supported by a horsehair pillow in a damask case that has an indentation in the center of its upper edge to cradle the nose and is lying on net 21.

There exists the danger that the rope net under the trunk may injure the skin when the person lying on it changes position, due to the relatively great pressure with which the knotted parts of the net touch arm, chest, buttocks or thigh. This danger is counteracted effectively according to the invention by a fine-meshed net permeable to air and heat radiation, which is placed on the coarse, supporting rope nets in the area where the body touches, and is secured against slipping by attaching the coarser rope net. However, a strip of coarser-mesh net, measuring several centimeters in width, is inserted in the net stretched over the bed frame, near the edge of the electrically heated insulation boards, to prevent undue impedance of the heated air rising from the heating boards.

Under these circumstances, the nets supporting the human body provide a welcome large-area massage during the night, resulting, together with the homogeneous radiant climate acting on all sides, in the disappearance of fat pads within a few weeks without leaving the skin loose, and in the breaking down of cellulitis that has persisted for many years.

According to the invention, the thin, metallic meander band 42 on the supporting foil 43, which is characterized according to its utilization as surface heating element and shown in FIG. 12, is produced by electrical burning of small, groove-like indentations 42a, by drawing live electrodes with graphite leads mounted on metal and arranged equidistantly, across the metallic covering of the insulated supporting foil band and by effecting the electrical contact to the metallic covering through a metallic cylindrical electrode rolling simultaneously—with pressure—on the metallic covering of the supporting foil band 43.

The supporting foil band 43, equipped with metallic meander bands in this manner, is, according to FIG. 13, covered by machine with a wider band of a puncture-proof insulation foil 45, which may have been previously covered on its side away from the meander band with a metal foil acting as ground shield 46. The foil strip consisting of parts 43, 42, 45 and 46 as well as a second electrically non-conductive foil strip 43a of the same width, is then fed into a so-called double-band machine. A rigid foam cord 44, which enters into a mechanically firm union with the mentioned strips and is enclosed at the edges by the insulation foil 45, on the one hand, and by foil 43a, on the other, according to FIG. 13, is produced by the injection of foam material into the double-band machine.

The electrically heated insulation boards 1 are obtained by the subsequent cutting apart of the cord produced in this manner along the perpendicular center lines between the even-numbered and odd-numbered foil grooves. The electrical connections to the ends of the meander bands 48 of these boards are produced, according to FIG. 15, with lead-in sheet metal strips 49 of the same material and are connected with the meander band ends by spot welding at numerous points. The welding is performed with graphite lead electrodes mounted on metal and applied to the live lead-in sheet metal strip by sending a condenser discharge through each of these electrodes to the live sheet metal. The underlying thin metal foil of the meander band 48 is thereby making firm contact with the live sheet metal strip 49 along small, spherical welding seams 50. According to FIG. 16, the adjacent meander band ends 52 and 53 of individual electrically heated insulation boards can be connected in series with one live sheet metal strip 51 each by the same process, after having been mounted to firm walls, and prior to the gluing of the insulation foil 45 at these points and the coating of the boards with a smooth plaster coat.

There where the connection with a flexible feed cable must be established, the lead-in, sheet metal strip is bordered with heavier copper sheet metal and clamped with rivets or screws that simultaneously establish contact with the cable, either directly by clamping the end of the cable or indirectly through a brass plug-in catch 56. When meander band and lead-in sheet metal strips are of aluminum, the latter must be edged with copper-aluminum sheet metal 54 and clamped together with several rivets 55, according to FIG. 15. In all of these cases the sheet metal edging the lead-in sheet metal strip must be connected mechanically firmly to the rigid foam board by means of a hardening plastic paste. This can be done in particular, according to the cross section in FIG. 17, in the groove of the rigid foam board 44, when the electrical contact from one self-supporting, electrically heated insulation board to the next is established with a longitudinally slotted tongue band 5a attached to tongue 5, recognizable in the cross section D—D of FIG. 18, as the boards 44 and 44a are fitted together. A longitudinally slotted sheet metal band may also be provided on the connecting side of tongue 5, for the feeding of current. Instead of an electrical connection to the sheet metal on the other side, this is equipped with a screw-in contact or a plug-in catch to connect with the feed cable in this case.

When the electrically heated insulation boards are glued to rigid, smooth walls, the protection of ground foil 46 against mechanical injury by the application of an at least 1-mm thick reinforcing, smooth plaster coat, after the gluing on of a fiberglass net, is adequate. When the electrically heated insulation boards are free-standing, however, this smooth plaster coat 47 is applied to both sides, according to FIG. 14, to prevent a buckling of the boards.

According to another concept of the invention, the lowering of the room air temperature below the radiant temperature can be greatly facilitated by impedance of the heat transfer from the electrically heated side of the insulation board to the room air. This impeding can be achieved in three ways, i.e., with honeycombs 58 fashioned of thin metal foil, which is glued onto the heated side 46 of the board, according to FIGS. 19 and 20, or with a thin plastic net that is metallized, if desired, has a mesh size of approx. 1-mm and a comparably very thin thread size, which is stretched in front of the heated layer 46 or 47, at a distance of a few millimeters; or also with plastic fiber particles 59 that are several millimeters long, which are dusted onto the layer 46 or 47 to which a self-hardening layer of glue is applied, by using a well-known electrostatic process, in which the plastic fiber particles arrange themselves, according to FIG. 21, vertically on the board surface with a statistically uniform distribution at a mutual mean distance equal to the length of the fiber.

According to the invention, the automatic regulation of the mean radiation temperature is based on the idea of connecting the—with respect to their electric conductance—temperature-dependent metallic surface heating elements electrically as test piece with a Wheatstone bridge with a low-ohmic and a high-ohmic bridge branch and charged with heating current, with at least the bridge resistance that is in series with the surface heating element being temperature-independent. During the warm-up period, the voltage across the zero branch of the bridge is a measure for the mean temperature of the surface heating elements—that are connected in series and, because of (a), also for the mean radiation temperature of the heat radiating boards. The disappearance of the voltage in the zero branch at a time at which the surface heating elements reach the temperature for which the potentiometer $R_3$ is set can thus be used to interrupt the heating current. To test for an out-of-balance bridge during the time when the ideal heating elements are cooling down, the heating current is switched on automatically at intervals of the order of one second for a period of a few 1/100 of a second and, on the reappearance of a given voltage in the zero branch of the bridge, for the time of another heating period. This procedure made it possible to keep the radiation temperature of a homogeneous heat radiating field automatically constant, plus or minus a few tenths of a degree, regardless of the room air temperature, the number of persons occupying the room and the outside temperature.

A circuit with which this thermostatic control of the mean radiation temperature is achieved is shown schematically in FIG. 22. The bridge formed from the resistance $R_h$ of the surface heating elements, the, in comparison to it, small temperature-independent resistance $R_m$, the high-ohmic resistances $R_1$, $R_2$, $R_4$ and the potentiometer $R_3$, is supplied from the alternating current net with the phase W and the zero conductor 0, via two thyristors 65 and 66 connected antiparallel. The zero branch of the ridge regulates a recitifier bridge consisting of two rectifiers 60 and 61 via an operational amplifer 59, that transforms the amplified alternating voltage of the zero branch in phase into a direct voltage of the one or the other polarity, and triggers the thyristors 65 and 66 via a light-emitting diode 62, a photoreceiver 63 and a regulator assembly 64, when the Wheatstone bridge is out of balance due to an inadequately low resistance of the surface heating element. The thyristors no longer are triggered as soon as the voltage in the zero branch of the bridge disappears or the phase of the alternating voltage in the zero branch is shifted by 180°, after passing through the bridge equilibrium, and the light-emitting diode 62 no longer emits light. A pulse generator is included in the regulator assembly 65, which triggers the thyristors 66 and 67 at intervals of the order of one second for a period of a few 1/100 of a second and starts a new warm-up period as soon as the Wheatstone bridge drops below a certain degree of imbalance due to the cooling off of the surface heating elements, to keep the imbalance of the bridge under constant control during the cooling of the surface heating elements.

Another circuit for the thermostatic control of the mean radiation temperature, which operates more dependably because of its high resistance to disturbances in the supply net, is shown in the schematic in FIG. 23. Here, the energy-consuming series resistance $R_m$ is replaced by a current transformer 68, connected between phase and the two heating element groups 72 and 73, and supplied by the two phases $P_1$ and $P_2$—mutually out of phase by 180°—of an American alternating current supply for 2×117 V.

The variation $\Delta R = R - R_s$ of the resistance R of the two groups from that of the desired value $R_s$ corresponding to the desired temperature $t_s$ is determined by the difference of the simultaneously measured voltage $U - U_s + \Delta U$ at the series of the heating element groups and the voltage $R_s(J_s + \Delta J)$, since the temperature variation $\Delta t$ from the desired temperature $t_s$ is obtained with the temperature coefficient alpha of the aluminum heating element.

$$\alpha \cdot \Delta t = \frac{\Delta R}{R_s} = \frac{1}{R_s}(R - R_s)$$

$$= \frac{1}{R_s}\left(\frac{U_s + \Delta U}{J_s + \Delta J} - R_s\right)$$

$$= \frac{1 + \Delta U/U_s}{1 + \Delta J/J_s} - 1.$$

Since $\Delta U/U_s$ and $\Delta J/J_s$ generally are much smaller than 1, the first member of the expansion into a series, $$\frac{1}{1 + \Delta J/J_s},$$

is adequate, and we can write for it:

$$\alpha \cdot \Delta t = (1 + \Delta U/U_s)(1 - \Delta J/J_s) - 1$$

$$= 1 + \Delta U/U_s - (1 + \Delta J/J_s)$$

-continued $$= \frac{1}{U_s} \cdot [(U_s + \Delta U) - R_s(J_s + \Delta J)].$$

The deviation $\Delta t$ of the radiation temperature of the surface heating elements from the set desired temperature thus is proportional to the difference of a voltage signal beta$(U_s+\Delta U)$ and a so-called current signal betaR$_s$ $(J_s+\Delta J)$, which is formed by connecting the low-voltage side of the current transformer 68 and the low-voltage side of the voltage transformer 74, after respective reducing of the voltage signal with the damping member with R$_{15}$ as pre-resistance, and the series of R$_{17}$ and the potentiometer resistance R$_{25}$ as cross-resistance, at the high-voltage side of the operational amplifier 69. The reduction of this reducing member and the ratio of the voltage transformers 74 can be chosen so that voltage and current signals are equal for $\Delta U=0$ and $\Delta J=0$, i.e., that they compensate each other.

Of the two alternating currents present at the high-voltage side of operational amplifier 68, the voltage signal beta$(U_s+\Delta U)$ is preponderant during the thermostatic control as long as $\Delta t$ is positive, i.e., the mean radiation temperature of the heating elements is greater than the desired temperature $t_s$ set at the potentiometer R$_{25}$, and, obversely, the current signal betaR$_s(J_s+\Delta J)$ is preponderant with the inverse phase as long as the mean radiation temperature is lower than the desired temperature $t_s$.

With constant line voltage, $\Delta U=0$ and the change in the current signal betaR$_s\Delta J = -$betaU$_s$alpha.$\Delta t$, i.e., they are proportional to $-\Delta t$. Consequently, the change specific for the current signal R$_s$J$_s$ is $$\frac{\beta R_s \cdot \Delta J}{\beta R_s \cdot J_s} = -\alpha \cdot \Delta t.$$

This relative deviation of the current signal can be compensated by a relative deviation of equal magnitude from the voltage signal $U_s$; consequently the equation of condition $$\frac{\beta \cdot \Delta U}{\beta U_s} = \frac{\Delta R_{25}}{R_{15} + R_{17} + R_{25} + \Delta R_{25}} \cdot \frac{R_{15} + R_{17} + R_{25}}{R_{17} + R_{25}} = -\alpha \cdot \Delta t.$$

results for the calibration of the linear potentiometer R$_{25}$ in the radiation temperature. If R$_{15}$ is much larger than R$_{17}$, i.e., the secondary voltage of the voltage transformer is chosen relatively high, this equation of condition changes to $$\frac{\Delta R_{25}}{R_{17} + R_{25}} = -\alpha \cdot \Delta t,$$

which means that the compensating deviation $\Delta R_{25}$ is then directly proportional to the deviation $\Delta t$ from the desired temperature $t_s$, and the potentiometer R$_{25}$ can then be calibrated directly for the desired temperature.

Because of the capacity through which part of the heating current flows to the shield of the heating element connected with the ground, the compensation of the current and voltage signal is not complete during the passing through the desired temperature $t_s$. Instead, the current signal is leading somewhat the line voltage applied to the heating element groups during warm-up so that the resulting vector of the voltage difference at temperature $t_s$ is shifted approx. 90° in comparison to the voltage signal. Consequently the rectangular signal behind the Schmitt-trigger (5)3-4 sets in earlier during the warm-up period than the inverse, delayed reference signal behind the Schmitt-trigger (5)11-10 resulting from the line voltage and the signal behind the Schmitt-trigger (5)13-12, which is limited to 1 ms and sets in at the same time. However, the pulses of the reference signals can pass the logic gate (7)4 only when the heating element groups have exceeded the desired temperature and the second flank of the signal occurring behind the Schmitt-trigger (5)3-4 coincides, in accordance with the rotation of the vector of the differential voltage, with the reference signal behind the Schmitt-trigger (5)13-12. Thus the path of the reference signal to the counter MC 14024 is opened. The 0-pulses behind the Schmitt-trigger (5)9-8 originating from the line voltage, which pass the counter MC 14040 and trigger the solid state relais 70 and 71 and the control LED via the transistor, are interrupted only when a larger number of off-pulses, (e.g. 32 0-pulses) have passed successively the logic gate (7)4 and have arrived at the counter MC 14024. In this case, a stop-signal that coincides with a pulse from the counter MC 14040 and locks this via the entrance R for a period of 5.1 s, originates at the low-voltage side of this counter. The unresponsiveness to incidental voltage peaks in the supply line and the reliable initiation of the cooling period is based on this well-known watchdog-system. At the end of this cooling period, the counter MC 14040 again opens the path for the triggering pulses of the solid state relais, and thus begins a new warming up process for the maintainance of the mean radiation temperature $t_s$.

The heat is turned on and off with the main switch that connects the voltage stabilizer (12) with the supply line and supplies the mentioned transistor and the operational amplifier 69 with the necessary charging voltage.

A reliable protection against fire is also to be provided in addition to the protection of the thermostatic temperature control against disturbances in the supply line, which must be signalled automatically by an alarm horn in case of power failure during a night's sleep in the tepidarium. A fire started by continuous spark puncture of the insulation foil 45 between the metallic meander foil 42 and the shield 46 connected with the ground is quenched under the smooth plaster coat 47 that is applied to the rigid foam board. An additional safeguard against the generation of a fire is given when the electrical heating rating during warming up of the freely radiating heating boards does not exceed three times the mean heating rating. Only considerably larger warming up ratings can cause an instable warming up, due to the positive temperature coefficient of the heating meander made of aluminum, which may lead to strong overheating at a localized area. Such overheating, however, would cause the insulation of the polyester foil lying between heating meander 42 and ground shield 46 to melt and would result in a fault current draining off toward the ground. This is the reason that an additional fire protection is guaranteed, provided that the electrically heated insulation boards that are equipped with ground shield are in all cases connected to the power line through at least one fault current safety switch that disconnects the heating boards immediately from the power line when the fault current exceeds 30 mA.

In the schematic of FIG. 24, the surface heating elements or electrically heated insulation boards are connected to the phases S and T of the three-phase power line in two groups Gp 1 and Gp 2 of mutually equal resistance, via the fault current safety switches 76 and 77 and the mercury relais 75. Since the capacitive current flowing toward the ground shield generally exceeds 30 mA, it must be compensated in both groups by a foreign capacitive current conducted through winding N, if it is not to activate the safety switch. According to the invention, the compensation is achieved respectively through the capacitive current of the other group that is flowing toward the ground after the capacitive currents of the two groups have been equalized accurately to $1°/_{oo}$ with respect to quantity and phase by additional shunt capacitors 78 and 79 at the group Gp 2, which is lower in ground capacity. Under these circumstances capacitive currents exceeding 70 mA, flowing from phases S and T via heating element capacities Cl 1 and Cl 2 through winding N of the fault-current safety switch of the other group, resp., can no longer produce a magnetic flow in the ring cores that leads to the triggering of the safety switch. The ground shields possess only an alternating voltage of less than 20 mV.

When, e.g., a fault current of more than 30 mA originates in group Gp 1 due to local overheating or overvoltage in group Gp 1, which punctures the insulation of the insulation foil lying between heating meander and ground shield or causes it to melt, the fault current safety switch 76 as well as the fault current safety switch 77 is tripped immediately, since the compensation for the actual shunt current is no longer available. The interruption of the heating current caused by the tripping is announced by the sound of the alarm horn, since the alarm horn 80 is supplied with current with the closing of contacts 1 and 2 in the safety switch 76.

It is known from experience that short-term voltage peaks in the alternating current supply line can also trip the fault current safety switches, since the chain conductor is not reformed with condensors 78 and 79, to which group Gp 1 with its heating resistances and distributed capacities would have to be assigned. These voltage peaks can be rendered harmless for the most part, however, with the diodes 81 and 82 connected antiparallel to the winding N, without lowering the reactivity to real fault currents.

When the heating boards are connected to an American power supply with two phases $P_1$ and $P_2$ that are out of phase by 180°, the mutually equiresistant groups Gp 1 and Gp 2 of electrically heated insulation boards that are connected in series or parallel can be connected, according to FIG. 25, to the two phases and zero-conductor N via a single fault current safety switch 83, provided that their effective shielding capacities are mutually equalized by an additional condenser 84 and the currents flowing through them are mutually cancelling each other out in the zero-conductor. A real fault current or more than 30 mA originating in one of the two groups and flowing toward the ground E, upsets the magnetic balance in the ring core of the fault current safety switch and trips its switch.

Even with the connection to the three phases of the alternating power supply, three mutually equiresistant groups Gp 1, Gp 2 and Gp 3 of electrically heated insulation boards can be protected against a fault current exceeding 30 mA by a single fault current safety switch 85, according to FIG. 26, when their ground capacities are mutually equalized by additional condensers 86, 87, 88 and 89, so that the capacitive currents in the ground compensate one another. The fault current safety switch, however, is tripped immediately as soon as one of the three groups is carrying a real current of more than 30 mA toward the ground.

The extremely valuable advantage of the circuits represented in FIGS. 24, 25 and 26 is found in the fact that the fault current safety switches are no longer tripped by those frequencies that are produced during the turning on and off of the heating current by the mercury relais Rel. 1 or by switching problems in the power supply line.

Since the person in the tepidarium is sleeping undressed on a lounge, he or the personnel in charge of his care must be wakened by an alarm device, when the heating current fails for any reason and the radiation temperature drops considerably below the set desired value, or when the radiation temperature exceeds the permissible value due to electronic failure. This purpose is served by the closed contact of a relais that is supplied with current from the line voltage behind the main switch and closes the circuit of an alarm horn fed by a battery that is constantly kept charged, or the resting contact of a fault current safety switch, which supplies the alarm horn 80 with current on being tripped, or the working contact of a bimetal switch connected parallel to the first-mentioned resting contact, which is set for the permissible room temperature.

I claim:

1. Equipment for the homogeneous radiant air-conditioning of a room, a tepidarium and/or a lounge with space enclosures (wall, doors, or ceiling) assembled of individual insulation boards, the sides of which that are facing the room are carrying an electrically conductive meander band that serves as surface heating element, which in turn is covered with an insulating plastic foil and shielded by a metal foil, characterized by means that increase the transfer of heat from the heating element to the heat-radiating surface of the insulation boards in such a manner that the temperature of this radiating surface is largely the same as the temperature of the heating element and is kept homogeneous; by connecting—at the edge at each end of each meander band by means of welded joints—stronger lead-in foil strips, attached to the rigid plastic foam board, with the metallic covering of the support foil of the metallic meander band that is firmly attached to the plastic foam board, said covering serving as heating element; by a coating—which reflects radiant heat and is protected against corrosion on the parts of the room enclosure that are not directly heated, particularly on the cold floor that is covered, in addition, in the areas of traffic, with skid-resistant netting having a mesh size of approximately one centimeter, which is impregnated with synthetic material; if desired, by a lounge in the tepidarium or a lounge with minitepidarium positioned over it, which consists of a bed frame sitting horizontally on legs, or suspended from the ceiling, over which a relatively coarsely knotted net is stretched, and which admits the heat radiation of the tepidarium or from the electrically heated insulation boards attached to the bed frame, as well as the cooler room air to the human body lying on it and to most of the surfaces on which the body is lying; by a ventilation of the room with cool air, entering through ventilating openings in the walls close to the cold floor, the size of which can be regulated, or through a ventilating slit of adjustable height between wall or electrically heated insulation board and floor, by which means the room air temperature can be lowered draftfree at least 4° C. below the mean radiation temperature of all radiant and reflecting areas of the room enclosure; possibly by a special impedance of the heat transfer from the electrically heated walls to the room air by means of a reinforcement of the boundary layer by an air cushion that is held in place by mechanical means at the surface of the vertically positioned electrically heated insulation boards, but permits the heat radiation from the insulation boards to enter the room unhampered; by a control device for the automatic adjustment of the mean radiation temperature of all heated surfaces of the insulation boards facing the room or the human body to a uniform and chronologically constant temperature that can be freely selected in the range from 22° C. to 45° C.; by a fire protection achievable with a fault current safety switch, based on the fact that the heating element is already disconnected from the power supply net at a fault current of 30 mA, which flows off from the heating element, via softened or burnt out insulation, to the ground shield, during overheating or spark-over at any point of the meander band through which the heating current flows, before the overheated spot or the spark-over can ignite the rigid plastic foam of the insulation board; by an alarm system to the tepidarium that is activated upon failure of the energy supply from the power line, or upon activation of a fault current saftey switch connected in series with the surface heating elements, or upon occurrence of an impermissibly high temperature, i.e., upon failure of the electronic control of the radiation temperature.

2. Installation according to claim 1, characterized by an assembly of the walls of the tepidarium with individual, easily transportable, electrically heated insulation boards 1 with a height equal to that of the wall, in which the boards are joined together at the sides with tongue 5 and groove 6, and are held between U-tracks 2 and 3 at their upper and lower edges, which in turn are held by supports 4, which may be wedged between the ceiling of the building and the floor, and by pivots 7 located in the rotational axis of the door, which engage in corresponding openings 8 in the U-tracks.

3. Installation according to claim 2 characterized by the fact that the thin metal foil applied to the support foil 43 is converted into a meander band 42 serving as heating element, by electrical burning of narrow, groove-like recesses 48 with graphite lead electrodes mounted on metal and pulled across this foil.

4. Installation according to claim 3, characterized by lead-in strips 49 of a thicker, flexible foil of the same metal as the foil meander band 42, which are spot-welded—by condenser discharges through applied graphite leads mounted on metal and the lead-in strips 49—in several places at the two ends 48 of the foil meander band applied to support foil 43 and firmly attached via support foil to the rigid plastic foam board 44, with the thicker lead-in strip 49, instead of the thin metal foil of meander band 42, serving as opposite electrode, and the lead-in strip forming a firm, metallic union with the thin meander band ends 48, which are firmly attached to the support foil, along small, spherical welded seams 50.

5. Installation according to claim 3, characterized by the fact that, after firm mounting of the rigid plastic foam boards, the meander band ends 52 and 53 of two adjacent rigid plastic foam boards are connected, where they meet, in a metallic union with a thicker, flexible metal foil strip 51 of the same metal as the meander band ends 52 and 53, by welding it at several points with condenser discharges through applied graphite leads mounted in metal, with the thicker metal foil strip 51, instead of the thin metal foil of the heating meander 42, serving as opposite electrode, and this strip forming a firm, metallic union with the thin meander band ends 52 and 53, which are glued onto the support foil, along small, spherical welded seams 50.

6. Installation according to claim 3, characterized by the fact that lead-in strips of aluminum, which are welded with their one end 48 of a meander band 42 of thin aluminum foil, which are welded with their one end to end 48 of a meander band 42 of thin aluminum foil, are bordered at their other end by one copper-aluminum sheet 54 each, which is pressed with its aluminum side against lead-in strip 49 by means of inserted rivets 55 and may also be connected at the same time, by a brass plug-in catch 56, to the copper side of the copper-aluminum sheet, in which case the copper-aluminum border is mechanically firmly attached, on its side away from the plug-in catch, to the rigid plastic foam board by means of a hardening plastic paste.

7. Installation according to claim 6, characterized by the fact that the folded copper-aluminum sheet 54 is glued properly into the adjacent groove 6 of the rigid plastic foam board, to make electrical contact there with an elastic sheet metal piece with several slits, on tongue 5 inserted into the groove.

8. Installation according to claim 2 characterized by an electrically insulating coating 45, and extending over the longitudinal edges of the rigid plastic foam board, covering metal foil 42 serving as heating element which in turn is covered, on the side away from the heating element, with a metal foil 46 to be connected with the ground.

9. Installation according to claim 2, characterized by the fact that a finishing coat 47, at least 1 mm in thickness, of a smooth plaster mixed with plastic is applied at least on the side of the rigid plastic foam board 44 that carries surface heating element 42, which makes the electrically heated insulation board resistant to mechanical damage and, applied to both sides of the board, prevents the warping of the electrically heated insulation board.

10. Installation according to claim 1 characterized by a tepidarium ceiling covered with a foil 13 reflecting heat radiation, which can be supported by the mentioned supports 4, and quickly acquires, at its lower surface, the temperature of the air flowing past it because of air or plastic foam insulation and/or reflection of the heat radiation opposite of the building ceiling.

11. Installation according to claim 1 characterized by a bed frame 19 without mattress, standing free or suspended in the tepidarium, over which is stretched a relatively coarse net 21 knotted of rope that supports the human body and impedes only insignificantly the flow of heat radiation emitted or reflected from the room enclosure as well as of cooler room air around the human body lying on it.

12. Installation according to claim 11, characterized by a second-coarse-mesh rope net 35, stretched over the bed frame, and several interlocking spring coils 36 of thin stainless steel wire, which, arranged along the sides of the bed frame, are located between the two coarse-mesh rope nets 21 and 35, their individual coils being attached to the individual openings of the rope nets in such a manner that an airy, upwardly convex mattress is produced that results in a large-area-massage of the abdomen and the front portions of the thighs while lying in prone position.

13. The installation according to claim 11, characterized by at least a second coarse-mesh rope net 37 for the support of abdomen and thighs in the prone position, which is suspended—above rope net 21 stretched over the bed frame—as sling or as closed band from two horizontal pipes attached above the bed frame and parallel to its long sides to head part 27 and foot part 28.

14. Installation according to claim 13, characterized by the fact that a fine-mesh net, permeable to air and heat radiation, lies above the upper rope net 37 and is attached to this in places with bands or tied to the horizontal pipes 40 and 41, the mesh openings of this net being much larger than the diameter of its yarn.

15. Installation according to claim 13, characterized by the fact that the head and an upper portion of the upper arm are suspended only on a fine-mesh net permeable to air and heat radiation, above the rope net 21 or 35, which does not restrict breathing to any significant degree.

16. Installation according to claim 11 characterized by the fact that a fine-mesh net permeable to air and heat radiation is stretched over rope net 21 or 35 supporting the human body, in the areas where the body is lying, into which a strip of coarser net is inserted at least in the direction of the long sides of the bed frame, close to the edge of the electrically heated insulation boards, with the size of the mesh opening always being much larger than the diameter of the netting rope or netting yarn.

17. Installation according to claim 1, characterized by a higher wood frame 22, standing free in the tepidarium, which, braced on the inside with angle irons 24, has stretched across it a relatively coarse net 21 knotted of rope and supporting the human body, with vertical, electrically heated insulation boards 1, which irradiate the human body, attached to the inner surfaces of this bed frame and extending with their upper edges to the rope net and with their lower edges to the floor covered with a heat radiation reflecting layer, with at least one of the boards at the long side of the bed frame being adjustable in height and forming a ventilating slit 24a at the floor that can be regulated and through which cool air is funneled separately, directly from the outside—that is, not from the inside of the tepidarium—through an insulated channel.

18. Installation for the radiant air-conditioning of a single lounge according to claim 1, characterized by a bed frame with head part 27 and foot part 28, across whose frame a relatively coarse net 21 knitted of rope is stretched that supports the human body, with vertical, electrically heated insulation boards 1, which irradiate the human body, attached to the inner surfaces of this bed frame and extending, with their upper edges to the rope net and forming, with their lower edges, a ventilating slit 24a, adjustable with knurled screws, above the floor covered with a heat radiation reflecting layer, and by a second frame 25 of electrically heated insulation boards directly above the rope net 21, which is at least of the same height and can be opened at least at one of the long sides by a swivelling lever with a counterweight 30, or can be raised in its entirety, and carries a ceiling frame 26 covered with heat radiation reflecting foil 13 horizontally, by means of supports above the head of the person sitting on the net, in such a manner that a ventilating slit one hand wide remains between foil 13 and the upper edges of the long sides of frame 25.

19. Installation according to claim 18, characterized by the fact that at least one of the electrically heated insulation boards located at the long sides of frame 25 has mounted in it, at the head end of the bed, a multi-foil window or a multifoil laminated window with glass-clear foils, with thin heating wires embedded in the inner foil or pane on the inside of the bed room, which, when supplied with current, make the window radiate into the bed room with the same mean temperature as the electrically heated insulation boards of frame 25.

20. Installation for the radiant air-conditioning of a single lounge according to claim 1, characterized by a bed frame with head part 27 and foot part 28, across whose frame a relatively coarse net 21 knotted of rope is stretched, that supports the human body, with vertical, electrically heated insulation boards 1, which irradiate the human body, attached to the inner surfaces of this bed frame and extending with their upper edges to the rope net and forming, with their lower edges, a ventilating slit that is adjustable in height by means of knurled screws 32, above the floor covered with a heat radiation reflecting layer, and by an electrically heated insulation board, 1a, with surface heating element, of the size of the bed frame radiating downward and attached horizontally and perpendicular to the bed frame, above the head of a person sitting on the net 21, by heat radiation reflecting covers 33 at head part 27 and foot part 28 of the bed frame and by blinds 34 of heat radiation reflecting foil attached at a distance of a hand's breadth from the insulation board 1a on at least one of the two long sides of the bed frame, in which case a heat radiation reflecting foil either hangs down freely suspended or is attached to a firm insulation board at the other long side.

21. Installation for the radiant air-conditioning of a single lounge according to claim 1, characterized by a bed frame with head part 27 and foot part 28, across whose frame a relatively coarse net 21 knotted of rope is stretched that supports the human body, with vertical, electrically heated insulation boards 1, which irradiate the human body, attached to the inner surfaces of this bed frame and extending with their upper edges to the rope net and forming, with their lower edges, a ventilating slit that is adjustable in height by means of knurled screws 32, above the floor covered with a heat radiation reflecting layer, and by a horizontal frame 26 above the head of the person sitting on net 21, which is covered with heat radiation reflecting foil 13 and attached perpendicular above the bed frame, from the longitudinal edges of which is suspended one electrically heated, transparent foil, each, e.g., also transparent foil with thin heating wires laminated to it, which, when supplied with current, fill the room above the rope net homogeneously with a heat radiation of constant temperature in the range from 30° to 42° C., where frame 26, together with the heating foils or also only one of the electrically heated, transparent foils formed into a blind, can be raised with a rope and pulley, from the inside of the lounge.

22. Installation according to claim 1, characterized by a honeycomb net 58 of thin, heat radiation reflecting metal foil strips of a width approximately equal to the diameter of the openings, which net reduces the heat transfer to the room air, when it is glued with its one side to the rigid plastic foam board equipped with heating element 42.

23. Installation according to claim 1, characterized by a fine net of smooth fiber, metallized if desired, with a mesh width of the order of 1 mm and a comparably very small fiber diameter, which net is stretched, at a distance of a few millimeters, in front of the electrically heated side of the insulation board, and permits the heat radiation of this board to flow through unhampered, but impedes the convention of the air layer between board and net as well as the heat transfer to the room air.

24. Installation according to claim 1, characterized by the fact that synthetic fiber particles 59, a few millimeters in length and metallized according to an electrostatic process if desired, are dusted onto the electrically heated side of the insulation board in such a manner that the synthetic fiber particles 59 arrange themselves vertically, in even distribution with a mutual mean distance of the length of the synthetic fiber, on the surface of the board, are glued to it by one end and impede the heat transfer to the room air.

25. Installation according to claim 1, characterized by the fact that the surface heating element is connected, as test piece, to a Wheatstone bridge with a low-ohmic ($R_h$, $R_m$) and a high-ohmic ($R_1$, $R_2$, $R_3$, $R_4$) bridge branch, which is charged with the heating current, with at least the bridge resistance $R_m$ being independent of the temperature, and the deviation of the mean radiation temperature of the surface heating elements or the electrically heated insulation boards from the desired value set a potentiometer $R_3$ being registered as alternating current, showing amount and phase, in the zero branch of the bridge.

26. Installation according to claim 25, characterized by the fact that the voltage in the zero branch of the bridge—after amplification by amplifier 60 and after in-phase rectification in a rectifier bridge with diodes 61 and 62—is fed into an LED (light-emitting diode) 63, the light pulses of which trigger two parallel thyristors 66 and 67 with opposite current passage direction, located in the heating current circuit, without interruption via a photo receiver 64 and a regulator assembly 65 excited in addition, for only a few 1/100 of a second at uniform intervals, as soon as the heating elements have cooled below the desired temperature set on the potentiometer $R_3$.

27. Installation according to claim 1, characterized by the fact that the heating current J, which flows through the surface heating element groups 72 and 73, transmits a current signal beta$R_s(J_s+\Delta J)$, via a current transformer 68, to an operational amplifier 69 for the thermostatic control of the heat radiation temperature of the surface heating elements via the solid state relais 70 and 71, and that a voltage signal beta($U+\Delta U$) is added to the current signal, which originates from the voltage across the surface heating element groups and flows out of phase by 180° C. to the input circuit of the operational amplifier via voltage transformer 74, with the voltage signal being dampened in such a manner by a damping member with $R_{15}$ as pre-resistance and with the series of $R_{17}$ and the potentiometer resistance $R_{25}$, which indicates the desired value $R_s$ of the total resistance of the heating element groups or the desired value of the mean radiation temperature, as cross-resistance, so that the current signal and voltage signal compensate each other in the input circuit of the operational amplifier in the case where $\Delta U=0$, $\Delta J=0$ and $\Delta t=0$.

28. Installation according to claim 27, characterized by the fact that of the two voltages in the input circuit of the operational amplifier 68 the current signal beta$R_s(J_s+\Delta J)$ is stronger when the surface heating elements have become too cold and $\Delta t$ is negative, and the voltage signal beta($U_s+\Delta U$) with the opposite phase is stronger when the surface heating elements have become too warm and $\Delta t$ is positive.

29. Installation according to claim 27 characterized by the fact that the output signal of the operational amplifier 69, converted into a rectangular signal by the connected Schmitt-trigger (5)3-4, together with a rectangular signal delayed by $R_2$ and $C_2$ in comparison to the line voltage, which is limited to a duration of the order of 1 ms by diode $D_4$ and resistance $R_4$ and Schmitt-trigger (5)13-12, is led to a logic gate (7)4, which transmits the latter signal only when the signal from the Schmitt-trigger (5)3-4 coincides, due to the delay that increases with the rising temperature of heating elements 72 and 73, with the signal from Schmitt-trigger (5)13-12, with a relatively large number of these pulses having to reach the counter MC 14024 successively before this can transmit a stop signal for the interruption of the passage of the triggering pulses for the solid state relais 70 and 71 to a second counter MC 14040, which then maintains the interruption for several seconds.

30. Installation according to claim 27 characterized by the fact that the relative deviation of the current signal $$\frac{\beta R_s \cdot \Delta J}{R_s J_s} = -\alpha \cdot \Delta t$$

is used for calibration of a linear potentiometer $R_{25}$ in desired values $t_s$ of the radiation temperature, by making use of the fact that each relative deviation of the current signal can be compensated by a relative deviation of the voltage signal.

$$\frac{\beta \cdot \Delta U}{\beta U_s} = \frac{\Delta R_{25}}{R_{15}+R_{17}+R_{25}+\Delta R_{25}} \cdot \frac{R_{15}+R_{17}+R_{25}}{R_{17}+R_{25}}$$

of equal magnitude with a corresponding change of the potentiometer $R_{25}$.

31. Installation according to claim 1 characterized by the fact that the electrically heating insulation boards of a room or a tepidarium are heated in two groups with almost equal total resistance of their heating elements 42 connected in series or parallel, via two 5-pole fault current safety switches 76 and 77 from the power supply line, whose capacitive current flowing via shields 46 to ground E is equalized with respect to quantity and phase coincidence by the additional capacitors 78 and 79, connected, respectively, between pole lead and ground, with the fault current safety switch provided for each group not even activated by capacitive ground currents exceeding the desired activating current, as long as the capacitive current of one group is connected without switch, to the zero branch winding of the fault current safety switch belonging to the other group.

32. Installation according to claim 31 characterized by an alarm horn that is supplied with current, upon failure of the energy supply from the power line, by a relais with resting contact from a charged battery, or upon activation of a fault current safety switch through a resting contact built into it, or by the closing of a bimetal switch located in the room.

33. Installation according to claim 1 characterized by the fact that the electrically heated insulation boards 1 of a room or a tepidarium are heated in two groups with almost total resistance of their heating elements 42 connected in series or parallel, via a 3-pole fault current safety switch 83, which has a fourth winding that is not connected to a switch, from the 2-phase alternating current supply line, whose capacitive currents flowing via shields 46 to the ground E are equalized for complete mutual compensation in the zero branch by an additional capacitor 84 between one phase and the ground, with the four-pole fault current safety switch 83 not even being activated by capacitive currents flowing to shield 46 that exceed the desired activating current.

34. Installation, according to claim 1 characterized by the fact that the electrically heated insulation board 1 of a room or a tepidarium are heated in 3 groups with almost equal total resistance of their heating elements 42 connected in series or parallel, via a 3-pole fault current switch 85 with a fifth winding without switch, from the alternating current line, whose capacitive current flowing via shields 46 to the ground are equalized for complete mutual compensation by additional capacitors 86 and 89, located respectively between phase and ground, with the 4-pole fault current safety switch 85 not even being activated by capacitive currents flowing to shield 46 that exceed the desired activating current.

* * * * *